(12) United States Patent
Urabe et al.

(10) Patent No.: US 11,264,806 B2
(45) Date of Patent: Mar. 1, 2022

(54) OPERATION VOLTAGE CONTROL CIRCUIT DEVICE FOR SOLAR CELLS CONNECTED IN SERIES OR OTHER POWER SUPPLIES

(71) Applicants: Toyota Jidosha Kabushiki Kaisha, Toyota (JP); Tokyo Metropolitan Public University Corporation, Tokyo (JP)

(72) Inventors: Shinichi Urabe, Shizuoka-ken (JP); Toshihisa Shimizu, Fuchu (JP)

(73) Assignees: TOYOTA JIDOSHA KABUSHIKI KAISHA, Toyota (JP); Tokyo Metropolitan Public University Corporation, Tokyo (JP)

( * ) Notice: Subject to any disclaimer, the term of this patent is extended or adjusted under 35 U.S.C. 154(b) by 0 days.

(21) Appl. No.: 17/003,532

(22) Filed: Aug. 26, 2020

(65) Prior Publication Data

US 2021/0066924 A1 Mar. 4, 2021

(30) Foreign Application Priority Data

Aug. 28, 2019 (JP) .............................. JP2019-155941

(51) Int. Cl.
  *H02J 3/38* (2006.01)
  *H02J 3/46* (2006.01)
(52) U.S. Cl.
  CPC ................ *H02J 3/381* (2013.01); *H02J 3/46* (2013.01); *H02J 2300/26* (2020.01)
(58) Field of Classification Search
  CPC ........... H02J 3/381; H02J 3/46; H02J 2300/26
  (Continued)

(56) References Cited

U.S. PATENT DOCUMENTS

2018/0062392 A1  3/2018  Urabe et al.
2018/0287389 A1*  10/2018  Yu .............................. H02J 3/38

FOREIGN PATENT DOCUMENTS

JP  2018-038245 A  3/2018

OTHER PUBLICATIONS

Shimizu, T., et al, "Improvement of the Efficiency Characteristics on the Photovoltaic Generation System based on a Generation Control Circuit", Proceedings of JSES/JWEA Joint Conference, 16, p. 57-60, 1996 (cited in specification).

(Continued)

*Primary Examiner* — Hal Kaplan
(74) *Attorney, Agent, or Firm* — Dinsmore & Shohl LLP

(57) ABSTRACT

An operation voltage control circuit device includes a column of selective electrical conduction elements connected in series, a column of capacitors connected in parallel to the selective electrical conduction elements, inverted voltage generation units alternately inserted between the selective electrical conduction elements and the capacitors, and electrode connection terminals connected in parallel to the capacitors between a pair of output terminals and connected to power supply cells connected in series to each other. The column of the selective electrical conduction elements are alternately grouped and are controlled to be alternately switched to an electrical conduction state or a cutoff state. The operation voltage control circuit device further includes auxiliary capacitors connected in parallel to the selective electrical conduction elements excluding both ends of the selective electrical conduction element column, and auxiliary inverted voltage generation units alternately inserted between the selective electrical conduction elements and the auxiliary capacitors.

16 Claims, 16 Drawing Sheets

(58) Field of Classification Search
USPC .......................................................... 307/78
See application file for complete search history.

(56) References Cited

OTHER PUBLICATIONS

Shimizu, T., "Generation Control Circuitry for Operating Point Normalization of Photovoltaic Modules", FB Technical News No. 56, p. 22-27, Nov. 1, 2000. (cited in specification).

Shimizu, T., et al. "Generation Control Circuit for Photovoltaic Modules", IEEE Transactions On Power Electronics, vol. 16, No. 3, p. 293-300, May 2001 (cited in specification).

Shimizu, T., et al., "Partial Shading Compensating Circuit", IEEEJ D Departmental Assembly, p. 1-17, Aug. 22, 2019.

* cited by examiner

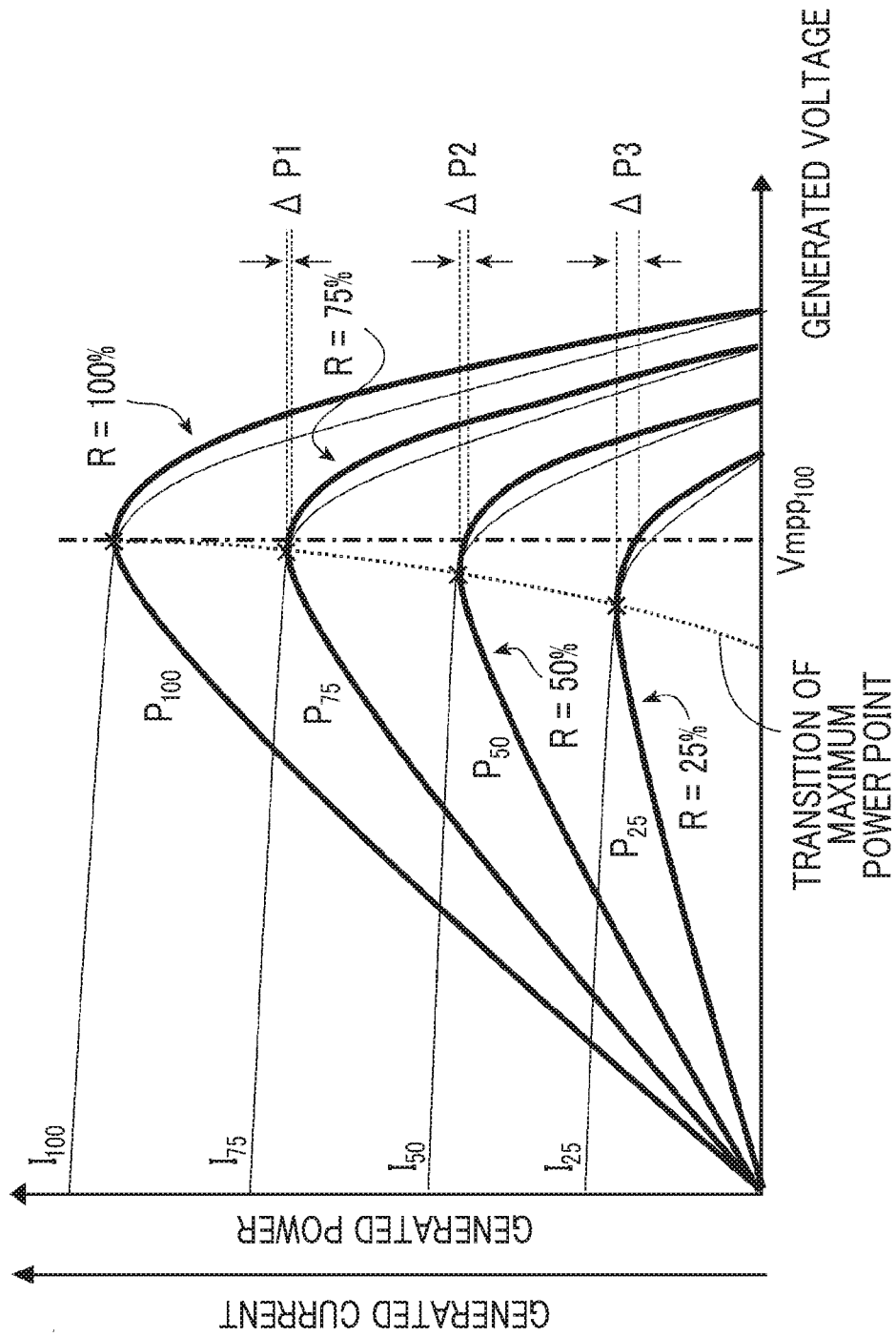

OPERATION VOLTAGE CONTROL CIRCUIT DEVICE FOR SOLAR CELLS CONNECTED IN SERIES OR OTHER POWER SUPPLIES

CROSS-REFERENCE TO RELATED APPLICATION

This application claims priority to Japanese Patent Application No. 2019-155941 filed on Aug. 28, 2019, which is incorporated herein by reference in its entirety including the specification, drawings, and abstract.

BACKGROUND

1. Technical Field

The present disclosure relates to an operation voltage control circuit device for solar cells connected in series or other power supplies.

2. Description of Related Art

In general, a generated voltage of one solar cell is lower than an operation voltage of each of various machines and instruments or a charger. For this reason, as one method for using a solar cell in operating the machines and instruments or charging the charger, a configuration (solar cell module) in which a plurality of solar cells is connected in series in a solar power generation system may be employed. However, in a solar cell module having a configuration in which the solar cells are simply connected in series, in a case where a shadow casts on a part of the cells due to a difference in installation angle of each solar cell, a building, or the like, and variation occurs in the amount of received light between the cells, the cell having a small amount of generated power may become a resistor (just a reverse biased diode) to decrease an output of the solar cell module.

More specifically, referring to FIG. 10A, as well known in the field, in general, the solar cell has a generated voltage-current characteristic such that, in a state in which a certain amount of light is received, the generated voltage increases from 0 V to a certain value and a current (fine solid line $I_{100}$ to $I_{25}$) is gradually reduced, and in a case where the generated voltage further increases, the current is rapidly reduced. Thus, the generated power has an optimum operation point × (referred to as a maximum power point or an optimum operation point) at which the magnitude of the generated power becomes maximum. Then, as shown in the drawing, in a case where the amount of received light of the solar cell is being reduced (R=100%→R=25%), the generated voltage-current characteristic changes in a direction in which a current ($I_{100}$→$I_{25}$) is reduced with respect to the generated voltage. Accordingly, generated power ($P_{100}$→$P_{25}$) also decreases, and as indicated by a dotted line shown in the drawing, the maximum power point (MPP) × also changes. In a case where a plurality of solar cells having such a characteristic is simply connected in series in a circuit, a common current flows in all solar cells. For this reason, when where all solar cells have the substantially same amount of received light, and have the substantially coincident maximum output point, the current becomes the same at the maximum output point, and all solar cells can be operated at the maximum output points. However, in a case where the amount of received light of a part of the solar cells in the solar cell module is reduced due to a shadow, a current common to a cell having a large amount of received light flows in a solar cell in which the amount of received light is reduced. Thus, an operation point of the solar cell is deviated from the original maximum output point, and the amount of generated power of the solar cells connected in series is reduced to a greater extent than reduction in the amount of received light. Since the solar cell itself, in which the amount of received light is reduced, becomes a resistor to a current flowing therethrough, power loss occurs, and a further decrease of output of the solar cell module is caused. That is, as described above, in a case where variation of the amount of received light is present among the solar cells in the solar cell module, a maximum power generation output corresponding to the amount of received light of the solar cell module is not obtained due to the variation, and output loss occurs.

Accordingly, as a device (also referred to as a "a circuit to compensate partial loss" or the like) that avoids a decrease in output due to the variation of the amount of received light among the solar cells in such a solar cell module, a power generation operation voltage control circuit device that is able to control an operation point of each of the solar cells connected in series individually has been suggested (Toshihisa Shimizu and six others, Proceedings of Japan Solar Energy Association/Japan Wind Energy Association Joint Conference, 1996, pp. 57-60, Toshihisa Shimizu, FB Technical News No. 56, Nov. 1, 2000, pp. 22-27, and Toshihisa Shimizu and three others, "Generation Control Circuit for Photovoltaic Modules" IEEE TRANSACTIONS ON POWER ELECTRONICS, VOL. 16, NO. 3, MAY 2001, pp. 293-300). Such a power generation operation voltage control circuit device controls generated voltage for each solar cell using a multi-stage buck-boost chopper circuit in a circuit configuration, in which a plurality of solar cells is connected in series, thereby being able to make different currents flow in the solar cells. With this, even though the solar cells connected in series are different in the amount of received light, the generated voltage can be adjusted such that a current flows in each solar cell at the maximum output point. Accordingly, all solar cells can be made to generate power substantially at the maximum output points.

Japanese Unexamined Patent Application Publication No. 2018-038245 (JP 2018-038245 A) has suggested a configuration using the power generation operation voltage control circuit device described above. In the configuration, as shown illustrated in FIG. 10B, in a column of n (where n is a positive integer) switching elements connected in series corresponding to each solar cell, capacitors (referred to as "voltage stabilization capacitors") are connected in parallel to both ends of all sets of (2k−1)th (where k is an integer of 1 to n/2) and 2k-th switching elements and all sets of (2κ−2)th (where κ is an integer of 2 to n/2) and (2κ−1)th switching elements counted from one end of the column of the switching elements, respectively, and the state of each of the switching elements connected in series is alternately switched between a first phase where all odd-numbered switching elements counted from one end of the column of the switching elements are brought into an electrical conduction state (ON state) and all even-numbered switching elements are brought into a cutoff state (OFF state) and a second phase where all odd-numbered switching elements are brought into the cutoff state (OFF state) and all even-numbered switching elements are brought into the electrical conduction state (ON state). In such a configuration, in a state in which a flow of a current with a different level for each solar cell is permitted, a duty ratio (a ratio of a length of a period of the cutoff state to a length of a predetermined cycle, that is, a sum of a period of the electrical conduction state and the period of the cutoff state) of the switching elements is not adjusted for each solar cell, but is set evenly, for example, to ½, and the generated voltages of all solar cells can be adjusted evenly to the same value. In the configuration, as understood from FIG. 10A, in a case where the amount of received light of the solar cell is reduced (R=100% to 25%), and the generated voltage-current characteristic changes in a direction in which the generated power ($P_{100}$ to $P_{25}$) and the current value ($I_{100}$ to $I_{25}$) are reduced with respect to the generated voltage, and accordingly, the generated voltage corresponding to the maximum power point (×) changes. For this reason, when an actual generated voltage of each solar cell is adjusted evenly, for example, to the generated voltage (one-dot-chain line: $V_{mpp100}$) of the solar cell (R=100%) having the largest amount of received light at the maximum power point, in the solar cell (R=75%, 50%, or 25%) having a small amount of received light, the actual generated voltage is deviated from the generated voltage at the maximum power point, and the generated power ($P_{75}$, $P_{50}$, or $P_{25}$) is reduced compared to power of each solar cell at the maximum power point. However, as understood from the drawings, in general, a change width of a voltage value at the maximum power point × with change in the amount of received light is comparatively small in a generated power characteristic of each amount of received light, and change in generated power value with respect to change in voltage value near the maximum power point is also comparatively gentle. For this reason, it is understood that a reduction amount $\Delta P1$, $\Delta P2$, or $\Delta P3$ of the generated power that may be generated due to the deviation of the operation point from the maximum power point caused by evenly adjusting the actual generated voltage of each solar cell is not so large. Thus, according to the configuration shown FIG. 10B, while at least one of the decrease in output or output loss due to the variation of the amount of received light among the solar cells as described above is suppressed small, the duty ratio of the switching element does not need to be adjusted for each solar cell, and may be set evenly, whereby switching control of the switching elements is simplified, and time and effort needed for setting the control can be significantly reduced.

SUMMARY

Incidentally, in control of a voltage and a current of the solar cell module in which the solar cells are connected in series as described above, in order to achieve efficiency improvement by reducing Joule loss while maintaining output power, a configuration in which an output voltage increases while an output current is reduced may be employed. For example, recently, in large-scale power generation equipment, such as mega solar power generation equipment, an output voltage may be increased to 1500 V, and in this case, in a case where an output voltage of one solar cell module is set to 30 V, 500 modules are connected in series. In this case, there is also a possibility that the number of modules connected in series increases in the future.

In a case where the number of solar cells connected in series increases as described above, in a power generation operation voltage control circuit device that is used as a partial shade compensation circuit, the number of stages of the boosting and deboosting chopper circuit provided corresponding to the respective solar cells increases accordingly. In this case, as the number of stages of the boosting and deboosting chopper circuit increases, when loss of the power generation operation voltage control circuit device increases to be equal to or greater than as much as the Joule loss is suppressed with the increase in the number of solar cells connected in series, it becomes meaningless to increase the output voltage by increasing the number of solar cells connected in series in order to suppress the Joule loss. Accordingly, in the power generation operation voltage control circuit device, it is desirable that an increase in loss due to the increase in the number of stages of the boosting and deboosting chopper circuit does not occur or can be suppressed as much as possible. In regard to this point, for example, as described below in "DETAILED DESCRIPTION OF EMBODIMENTS", the circuit device having the configuration illustrated in FIG. 10B is operated such that, in a case where a part of the solar cell column connected in series goes into a partial shade, and a solar cell, the output current of which becomes relatively low, occurs, a part of current flowing between the output terminals makes a path to avoid the solar cell, the output current of which becomes low, through the switching elements and the voltage stabilization capacitors. In this case, the detour of the current causes delivery of electric charges (through the switching elements) like switched capacitor among all voltage stabilization capacitors Cv1 . . . (including the voltage stabilization capacitors away from the partial shade) between the output terminals. In this case, since the capacitors have parasitic resistance and the switching elements have on-resistance, the delivery of the electric charges among the voltage stabilization capacitors causes Joule loss due to charging and discharging in all voltage stabilization capacitors and Joule loss due to current passage in all switching elements. Then, in the configuration, in a case where the number of voltage stabilization capacitors increases with the increase in the number of stages of the boosting and deboosting chopper circuit, the number of voltage stabilization capacitors and the number of switching elements relating to the delivery of the electric charges increase. For this reason, the Joule loss due to the delivery of the electric charges among the voltage stabilization capacitors increases. Accordingly, it is highly advantageous in a case where the circuit configuration is improved such that delivery of electric charges does not occur among all voltage stabilization capacitors due to a partial shade in such a solar cell column, and the Joule loss in the voltage stabilization capacitors and the switching elements can be reduced.

The present disclosure provides a power generation operation voltage control circuit device capable of evenly adjusting generated voltages of all cells without depending on an amount of received light of each cell in a solar cell module including a column of a plurality of solar cells connected in series, and specifically, a device in which loss with an increase in the number of stages of a boosting and deboosting chopper circuit provided corresponding to a solar cell does not increase as much as possible. It is assumed that the "power generation operation voltage control circuit device" indicates a device having circuit portions (a connection terminal to a solar cell, a diode, a capacitor, an inductor or a transformer, and the like) for controlling a generated voltage and a current of each of solar cells connected in series, and a "solar power generation device" indicates a device having a configuration including a solar cell module having solar cells connected in series and the power generation operation voltage control circuit.

Incidentally, the circuit configuration of a device according to the present disclosure described below in more detail is not limited to a solar cell, and is also usable for control of an operation voltage of each power supply element in a module in which any power supply elements (for example, chemical cells, fuel cells, storage cells, power generators, thermoelectric elements, or the like) configured to output power are connected in series. Accordingly, the present disclosure provides an operation voltage control circuit device capable of controlling an operation point of an individual power supply element (cell) in a module, in which at least one of a plurality of solar cells or power supply elements (cells, storage cells, power generators, thermoelectric elements, or the like) is connected in series, and specifically, a device in which loss with an increase in the number of stages of a boosting and deboosting chopper circuit provided corresponding to the power supply elements (cells) does not increase as much as possible.

An aspect of the present disclosure relates to an operation voltage control circuit device for a plurality of power supply cells connected in series. The device includes 2k (where k is a positive integer) selective electrical conduction elements, 2k capacitors, inverted voltage generation units, a pair of output terminals, a plurality of electrode connection terminals, a circuit controller, and a reference voltage decision unit. The 2k selective electrical conduction elements are connected in series and configured to be selectively brought into an electrical conduction state in which electrical conduction is provided between both terminals of each of the selective electrical conduction elements or a cutoff state in which electrical conduction between both terminals is cut off. The 2k capacitors are connected in parallel to the respective selective electrical conduction elements and connected in series to one another. Each of the inverted voltage generation units is inserted into a 2i-th (where i is an integer of 1 to k) circuit line counted from one end among circuit lines, which connect terminals of the selective electrical conduction elements and terminals of the capacitors, configured such that a current is able to flow in both directions between both ends of each of the inverted voltage generation units, and configured to generate a voltage, which is cyclically inverted between both ends. The electrode connection terminals are connected to positive electrodes and negative electrodes of n (where n is an integer of 1 to 2k) power supply cells, which are connected in parallel to at least a part of the 2k capacitors and connected in series to one another, between the output terminals. The controller is configured to perform control such that the voltage generated between both ends of each of the inverted voltage generation units is cyclically inverted. The reference voltage decision unit is configured to decide a reference voltage for deciding an output voltage between the output terminals. The circuit controller is configured to alternately switch a state of each of the selective electrical conduction elements (switches or MOSFETs) connected in series between a first phase and a second phase in a predetermined cycle. In the first phase, all odd-numbered selective electrical conduction elements counted from a negative electrode side of a power supply cell column in a column of the selective electrical conduction elements connected in series are brought into the electrical conduction state and all even-numbered selective electrical conduction elements counted from the negative electrode side of the power supply cell column in the column of the selective electrical conduction elements connected in series are brought into the cutoff state. In the second phase, all odd-numbered selective electrical conduction elements counted from the negative electrode side of the power supply cell column in the column of the selective electrical conduction elements connected in series are brought into the cutoff state and all even-numbered selective electrical conduction elements counted from the negative electrode side of the power supply cell column in the column of the selective electrical conduction elements connected in series are brought into the electrical conduction state. The circuit controller is configured to alternately invert a direction of the generated voltage of each of the inverted voltage generation units such that the generated voltage of each of the inverted voltage generation units becomes higher on the capacitor side in the first phase and becomes higher on the selective electrical conduction element side in the second phase. An operation voltage of each of the power supply cells connected to the electrode connection terminals is decided based on a ratio of durations of the first phase and the second phase of the selective electrical conduction elements controlled by the circuit controller and the reference voltage. The operation voltage control circuit device further includes 2(k−1) auxiliary capacitors, and auxiliary inverted voltage generation units. The 2(k−1) auxiliary capacitors are connected in parallel to the respective selective electrical conduction elements excluding the selective electrical conduction elements at both ends in the column of the selective electrical conduction element and connected in series to one another. Each of the auxiliary inverted voltage generation units is inserted into a 2j-th (where j is an integer of 1 to k−1) circuit line counted from one end among circuit lines, which connect the terminals of the selective electrical conduction elements and terminals of the auxiliary capacitors, configured such that a current is able to flow in both directions between both ends of each of the inverted voltage generation units, and configured to generate a voltage, which is inverted between both ends in synchronization with switching between the first phase and the second phase of the state of each of the selective electrical conduction elements. A direction of the generated voltage of each of the auxiliary inverted voltage generation units is alternately inverted such that the generated voltage of each of the auxiliary inverted voltage generation unit becomes higher on the selective electrical conduction element side in the first phase and becomes higher on the auxiliary capacitor side in the second phase.

In the aspect of the present disclosure, the "power supply cell" may be a solar cell or any power supply element that discharges a current from a positive electrode, and outputs power as a current flows into a negative electrode, such as a chemical cell, a fuel cell, a storage cell, a power generator, or a thermoelectric element. The "selective electrical conduction element" may be any unit or element that has both terminals and is selectively brought into either of the electrical conduction state (ON state) in which electrical conduction is provided between both terminals or the cutoff state (OFF state) in which electrical conduction is cut off, and specifically, may be either or any switching element, such as a MOSFET or other transistors being used in the field, in which an electrical conduction state and a cutoff state of a current between a pair of terminals are switched in response to a control input, or a rectifier unit, such as a diode, which permits a flow of a current solely in a direction from a anode to a cathode (as described below, either is selected according to a configuration of a circuit as appropriate). The "capacitor" and "auxiliary capacitor" may be a ordinary capacitor, and as described above, the capacitors and the auxiliary capacitors are connected in series and connected in parallel to the column of the selective electrical conduction elements. The power supply cells are connected in parallel to at least a part of the column of the "capacitors", respectively, and are connected in series (the term "auxiliary capacitor" is used for the purpose of distinguishing from the "capacitor" in the column to which the power supply cells are connected in parallel). In the configuration of the present disclosure, the power supply cells may not be connected to all capacitors in the capacitor column unless particularly designated. The "inverted voltage generation unit" and the auxiliary inverted voltage generation unit" are configured of a conductor in which a current is able to flow between both ends thereof, and may be an element or a unit in which electromotive force is generated between both ends by any principle. For the "inverted voltage generation unit", as described below, typically, a coil of an inductor or a transformer is employed; however, the present disclosure is not limited thereto. In the above-described configuration, as will be understood from drawings described below, the "inverted voltage generation units" are at least alternately inserted between the "selective electrical conduction elements" and the "capacitors" (to which the power supply cells are connected in parallel), and the "auxiliary inverted voltage generation units" may be alternately inserted between the "selective electrical conduction elements" and the "auxiliary capacitors" so as to be different from places where the "inverted voltage generation units" are inserted. The "circuit controller" may be any unit that controls the voltage generated between both ends of each of the "inverted voltage generation units" in any aspect as illustrated below, and specifically, may be a unit configured such that an operation to control the voltage between both ends of each of the "inverted voltage generation units" achieves alternately switching of the state of each of the selective electrical conduction elements connected in series between the first phase (a phase where all odd-numbered selective electrical conduction elements counted from a negative electrode side of the power supply cell column in the column of the selective electrical conduction elements connected in series are brought into the electrical conduction state and all even-numbered selective electrical conduction elements counted from the negative electrode side of the power supply cell column are brought into the cutoff state) and the second phase (a phase where all odd-numbered selective electrical conduction elements counted from the negative electrode side of the power supply cell column in the column of the selective electrical conduction elements connected in series are brought into the cutoff state and all even-numbered selective electrical conduction elements counted from the negative electrode side of the power supply cell column are brought into the electrical conduction state) in the predetermined cycle (may be discretionarily set) as described above, and inverting of the direction of the generated voltage of each of the inverted voltage generation units in synchronization with the switching. A voltage between both ends of each of the inverted voltage generation units becomes higher on the capacitor side in the first phase and becomes higher on the selective electrical conduction element side in the second phase according to the Kirchhoff's law. The direction of the generated voltage of each of the auxiliary inverted voltage generation units is also inverted in synchronization with the switching of the state of each of the selective electrical conduction element with the operation of the "circuit controller". A voltage between both ends of each of the auxiliary inverted voltage generation units becomes higher on the selective electrical conduction element side in the first phase and becomes higher on the auxiliary capacitor side in the second phase according to the Kirchhoff's law. The "reference voltage decision unit" may be a unit that provides the reference voltage to a certain part in the circuit device in any aspect, and the reference voltage may be the output voltage itself between the output terminals or a voltage that decides the output voltage.

The device of the present disclosure basically has a structure in which each selective electrical conduction element connected corresponding to each power supply cell and one of the capacitor and the inverted voltage generation unit corresponding to the selective electrical conduction element form a boosting and deboosting chopper circuit of one stage, and the boosting and deboosting chopper circuits are configured in multi stages. Then, in a basic operation of the device of the present disclosure, as described below in "DETAILED DESCRIPTION OF EMBODIMENTS", a state in which the operation voltages of the power supply cells or held voltages of the capacitors connected corresponding to the selective electrical conduction elements in a group of odd-numbered selective electrical conduction element (referred to as an odd-numbered group of selective electrical conduction elements) counted from the negative electrode side of the power supply cell column in the selective electrical conduction element column become the same, and the operation voltages of the power supply cells or the held voltages of the capacitors connected corresponding to the selective electrical conduction elements in a group of even-numbered selective electrical conduction elements (referred to as an even-numbered group of selective electrical conduction elements) counted from the negative electrode side of the power supply cell column in the selective electrical conduction element column become the same is brought with the operations of the switching of each of the selective electrical conduction element between the first phase and the second phase and the inverting of the direction of the generated voltage of each of the inverted voltage generation unit in synchronization with the switching. In this case, in regard to a current flowing in each of the power supply cells connected in series, a surplus of the current of each power supply cell that is a difference between an amount of current of a power supply cell where the current becomes a maximum and an amount of current decided according to a voltage and current characteristic of the individual power supply cell makes a path to the selective electrical conduction element under the operation of the capacitor and the inverted voltage generation unit, and the current of each power supply cell has a magnitude decided according to the voltage and current characteristic of the individual power supply cell corresponding to the set generated voltage or operation voltage (that is, each power supply cell is operated at the operation point of the set voltage). However, in a configuration in which the capacitors and the inverted voltage generation units are merely provided between the selective electrical conduction elements and the power supply cells, the setting of the operation voltages of the power supply cells or the held voltages of the capacitors may be unstable depending to the characteristics of circuit elements used in the selective electrical conduction elements or the inverted voltage generation units or the power supply cells, accuracy of characteristics, such as parasitic resistance and impedance.

Accordingly, in the device of the present disclosure, as described above, the column of the auxiliary capacitors is connected to the selective electrical conduction elements in parallel with the column of the capacitors through the auxiliary inverted voltage generation units, and stabilization of the operation voltages of the power supply cells or the held voltages of the capacitor is achieved. In the configuration as described above, plainly speaking, each selective electrical conduction element and the auxiliary capacitor and the auxiliary inverted voltage generation unit corresponding to the selective electrical conduction element form a second boosting and deboosting chopper circuit with respect to each selective electrical conduction element, and the second boosting and deboosting chopper circuits are configured in multi stages, whereby the column of the second boosting and deboosting chopper circuits is formed with respect to the column of the selective electrical conduction elements. In the configuration as described above, since the inverted voltage generation units and the auxiliary inverted voltage generation units are alternately connected to the column of the selective electrical conduction elements, an odd-numbered stage and an even-numbered stage counted from the negative electrode side of the power supply cell column in the column of the second boosting and deboosting chopper circuits have a function of holding voltages of an odd-numbered stage and an even-numbered stage counted from the negative electrode side of the power supply cell column in a column of first boosting and deboosting chopper circuits each including the capacitor and the inverted voltage generation unit, respectively. Thus, the operation voltage of each of the power supply cells connected in series is stabilized. In this case, according to the configuration in which the auxiliary capacitor column is provided as described above, as described below in "DETAILED DESCRIPTION OF EMBODIMENTS", when an operation current of a part of the power supply cell column connected in series becomes relatively low and a detour of a part of the current occurs (for example, in a case where a part of the solar cell column goes into a partial shade, or the like), the delivery of the electric charges like bucket-brigade passing through the whole of the voltage stabilization capacitor column as in the circuit configuration illustrated in FIG. 10B does not occur. Thus, Joule loss in the auxiliary capacitor column and the selective electrical conduction elements due to variation of the operation current of the power supply cell column becomes low compared to the related art (the circuit configuration as in FIG. 10B). With this, an increase in loss due to an increase in the number of auxiliary capacitors in increasing the number of stages of the boosting and deboosting chopper circuit along with the number of power supply cells connected in series is suppressed compared to the related art.

In the above-described configuration, the circuit controller may switch the state of each of the selective electrical conduction elements such that the durations of the first phase and the second phase become the same, that is, the duty ratio of each of the selective electrical conduction elements (a length of a predetermined cycle, that is, a ratio of a length of a period of the cutoff state to the sum of a period of the electrical conduction state and the period of the cutoff state) becomes ½. In this case, the operation voltages of all power supply cells are controlled to the same level, and the control of the output voltage is facilitated. In a case where each of the power supply cells is a solar cell, the generated voltage of the power supply cell having a largest amount of received light among the power supply cells may be set to a generated voltage at a maximum power point. In this case, since a power generation output of the solar cell having the largest amount of received light becomes a maximum, and the power generation outputs of other solar cells substantially become a maximum, it is possible to obtain a substantially maximum power generation output in the solar cell module.

The configuration in which the auxiliary capacitor column is provided through the auxiliary inverted voltage generation units in the present disclosure may be applied in various aspects as described below.

In a first aspect of the present disclosure, each of the selective electrical conduction elements may be a switching element that selectively provides electrical conduction between both terminals of the capacitor connected corresponding to each of the selective electrical conduction elements as described above. Each of the inverted voltage generation units and the auxiliary inverted voltage generation units may be an inductor (the latter is referred to as an "auxiliary inductor"). The circuit controller may include a switching controller that switches a state of each of the switching elements between the first phase and the second phase. The reference voltage decision unit may be configured to adjust the output voltage between the output terminals as the reference voltage or a voltage (a cell voltage or the like) held by a load connected between the output terminals may become the reference voltage, and the output voltage between the output terminals may be decided based on the reference voltage (in this case, the load becomes the reference voltage decision unit). In the configuration as described above, in a case where the switching controller executes the switching control between the first phase and the second phase of the switching elements, the generated voltage of each of the inductors and the auxiliary inductors is inverted in synchronization with the switching control. Then, the operation voltage of each of the power supply cells connected to the electrode connection terminals is decided based on the output voltage between the output terminals and the ratio (that is, a duty ratio) of the durations of the first phase and the second phase of the switching elements.

In the above-described configuration, although the power supply cells may be connected in parallel to all capacitors, respectively, the power supply cells may not be connected to a part of capacitors (in this case, the output voltage boosted from the operation voltage of each of the power supply cells is obtained). All capacitors may be connected in series between the output terminals or solely the capacitors, to which the power supply cells are connected, may be connected in series between the output terminals.

In a second aspect of the present disclosure, a column of second to 2k-th selective electrical conduction elements counted from one end of the column of the selective electrical conduction elements (may be either of the negative electrode side or a positive electrode side of the power supply cell column) is a rectifier unit column in which rectifier units, each of which has a positive electrode and a negative electrode and is configured to permit a flow of a current solely in a direction from the positive electrode and to the negative electrode, are connected in series. A negative electrode side of the rectifier unit column is connected to a positive electrode side of the power supply cell column. The circuit controller is configured to generate a voltage, which has a magnitude as a function of the reference voltage and a direction of which is cyclically inverted, between both ends of a first inverted voltage generation unit counted from the one end of the selective electrical conduction element column among the inverted voltage generation units. Here, the voltage generated between both ends of the first inverted voltage generation unit as the function of the reference voltage may have a magnitude that is appropriately set within an allowable range of an operation of an element or a unit in the device by a user or a designer of the device, and may be typically a voltage, the direction of which is cyclically inverted at regular intervals and which has the same magnitude in both directions; however, the present disclosure is not limited thereto (that is, the voltage may be different in magnitude and time depending on the direction).

In the configuration of the second aspect, as described above, in the selective electrical conduction element column, the rectifier units, such as diodes, are employed as the second to 2k-th selective electrical conduction elements counted from the one end of the selective electrical conduction element, a switching element or a rectifier unit is employed according to a form). In the configuration, in a case where the circuit controller generates the voltage, which has the magnitude discretionarily set and the direction of which is cyclically inverted, between both ends of the first inverted voltage generation unit, as described below in detail in "DETAILED DESCRIPTION OF EMBODIMENTS", the rectifier units connected in series are operated to be automatically alternately switched between the electrical conduction state and the cutoff state with the operations of the inverted voltage generation units, the auxiliary inverted voltage generation units, the rectifier units, the auxiliary capacitors, and the capacitors parallel to the respective power supply cells, whereby the first phase and the second phase are alternately implemented. Then, in a state in which different currents are able to flow in the respective power supply cells, the magnitude of an operation voltage (in a solar cell, a generated voltage) of each power supply cell coincides with the magnitude of the voltage generated in any direction between both ends of the first inverted voltage generation unit. In particular, in a case where the voltage, the direction of which is cyclically inverted at regular intervals and which has the same magnitude in both directions, is generated between both ends of the first inverted voltage generation unit, it is possible to evenly adjust the operation voltage of the power supply cell to the same magnitude. In the configuration as described above, since the second to 2k-th selective electrical conduction elements counted from the one end of the selective electrical conduction element column are the rectifier units, a circuit configuration and control for individually providing a control input are not needed for the second to 2k-th selective electrical conduction elements. Then, since dynamic control should be performed solely on the circuit controller that controls the voltage of the first inverted voltage generation unit, the configuration of the device and the operation for control are simplified. In the second aspect, compared to the configuration of the first aspect, since each of the second to 2k-th selective electrical conduction elements counted from the one end of the selective electrical conduction element column is replaced from a switching element, such as a transistor including a MOSFET, with the rectifier unit, such as a diode, saving of cost is expected accordingly.

The specific configuration of the device of the above-described second aspect may be implemented by any of forms described below.

In a first form, each of the inverted voltage generation units and the auxiliary inverted voltage generation units may be an inductor. A first selective electrical conduction element counted from the one end of the column of the selective electrical conduction elements (may be either of the negative electrode side or the positive electrode side of the power supply cell column) may be a switching element that selectively provides electrical conduction between both terminals of the capacitor connected corresponding to the first selective electrical conduction element. The circuit controller may include a switching controller that alternately switches a state between both terminals of the switching element between an electrical conduction state and a cutoff state cyclically. The reference voltage decision unit may include a voltage source that is connected in parallel to the capacitor corresponding to the switching element and connected in series to the one end of the column of the selective electrical conduction elements, the voltage source being configured to generate a voltage having a magnitude discretionarily set between a positive electrode and a negative electrode of the voltage source. That is, while the power supply cell is not connected to the first selective electrical conduction element counted from the one end of the selective electrical conduction element column, the voltage source is connected to the first selective electrical conduction element (accordingly, one to 2k−1 power supply cells may be connected in parallel to the column of the 2k selective electrical conduction elements). The "voltage source" may be any voltage source that supplies the voltage discretionarily set between the positive electrode and the negative electrode of the voltage source. Then, in this case, the "voltage source" is the reference voltage decision unit, the reference voltage is a supply voltage of the voltage source, and the generated voltage (induced electromotive force) of each of the inductors and the auxiliary inductors and the operation voltage of each of the power supply cells connected to the electrode connection terminals are decided based on the supply voltage of the voltage source and the ratio of the durations of the first phase and the second phase of the selective electrical conduction elements controlled by the switching controller.

In the above-described configuration, in a case where the switching element operates to alternately switch the state between both terminals between the electrical conduction state and the cutoff state cyclically, a voltage, a direction of which is alternately inverted, is generated between both ends of the first inverted voltage generation unit. With this, as described below, the first phase and the second phase are alternately achieved in the column of the selective electrical conduction elements including the switching element and the column of the rectifier units, and as described above, the magnitude of the operation voltage of each of the power supply cells is decided such that the operation voltage of each of a group of power supply cells connected in parallel to the odd-numbered group of selective electrical conduction elements and a group of power supply cells connected in parallel to the even-numbered group of selective electrical conduction elements becomes even. In particular, in a case where control is performed such that the switching element alternately switches the state of both terminals between the electrical conduction state and the cutoff state cyclically at regular intervals (that is, in a case where a duty ratio is ½), a voltage, which has the same magnitude as the voltage of the voltage source and a direction of which is alternately inverted, is generated between both ends of the first inverted voltage generation unit, and the operation voltage of each power supply cell is adjusted evenly to be the same as the voltage between both ends of the voltage source. In the first form, since a target of dynamic control is one switching element, the number of circuits for a control input may be one, and the configuration of the circuit is simplified and control is also simplified, for example, compared to the first aspect. In the first form, the power supply cells and the voltage source may be connected between the output terminals or solely the power supply cells may be connected between the output terminals and the voltage source may be connected outside between the output terminals.

In the configuration of the first form, in a case where switching of the state between both terminals of the switching element to between the electrical conduction state and the cutoff state is not performed at regular intervals, the operation voltage of each of the power supply cells connected in parallel to the same group of selective electrical conduction elements as the selective electrical conduction element, to which the voltage source is connected in parallel, among the power supply cells connected in parallel to the odd-numbered group or even-numbered group of selective electrical conduction elements evenly coincides with the supply voltage of the voltage source, and the operation voltage of each of the power supply cells connected in parallel to the other group of selective electrical conduction elements coincides with a value obtained by multiplying the supply voltage of the voltage source based on a function of the duty ratio. It should be understood that this case also belongs to the scope of the present disclosure.

In a second form of the second aspect of the device of the present disclosure, each of the inverted voltage generation units and the auxiliary inverted voltage generation units may be an inductor. A first selective electrical conduction element counted from the one end of the selective electrical conduction element column (may be either of the negative electrode side or the positive electrode side of the power supply cell column) may be a switching element that selectively provides electrical conduction between both terminals of the capacitor connected corresponding to the first selective electrical conduction element. The circuit controller may include a switching controller that alternately switches a state between both terminals of the switching element between an electrical conduction state and a cutoff state cyclically. One power supply cell may be connected in parallel to the capacitor corresponding to the switching element. The reference voltage decision unit (a voltage controller or a load connected between the output terminals) may be configured to decide the output voltage between the output terminals as the reference voltage based on any voltage control or a voltage held by the load. That is, the power supply cells may be connected in parallel to all selective electrical conduction elements. In this case, the generated voltage (induced electromotive force) of each of the inductors and the auxiliary inductors and the operation voltage of each of the power supply cells connected to the electrode connection terminal are decided based on the decided output voltage and the ratio of the durations of the first phase and the second phase of the selective electrical conduction elements controlled by the switching controller.

In this form, in a case where the switching element operates to be alternately brought into the electrical conduction state and the cutoff state cyclically, as in the first form, the voltage, the direction of which is alternately inverted, is generated between both ends of the first inverted voltage generation unit. With this, as described below, the first phase and the second phase are alternately achieved in the column of the selective electrical conduction elements including the switching element and the column of the rectifier units, and as described above, the magnitude of the operation voltage of each of the power supply cells is decided such that the operation voltage of each of the group of power supply cells connected in parallel to the odd-numbered group of selective electrical conduction element and the group of power supply cells connected in parallel to the even-numbered group of selective electrical conduction elements becomes even. Note that, in this form, as in the first form, the output voltage between the output terminals is held to the magnitude discretionarily set or the magnitude decided based on the voltage of the load by the reference voltage decision unit, and the magnitude of the operation voltage of each of the power supply cells becomes a function of the output voltage. In the configuration as described above, in a case where the switching element operates to repeat the electrical conduction state and the cutoff state cyclically at regular time intervals, the voltage having the same magnitude of the operation voltage of the power supply cell is generated between both ends of the first inverted voltage generation unit such that the direction is alternately inverted. With this, as described above, the magnitude and the direction of the operation voltage of each of the power supply cells are evenly adjusted to be the same. In this case, when the voltage (output voltage) between the output terminals, that is, the sum of the operation voltages of the power supply cells (or the held voltages of the capacitors) is held to the magnitude discretionarily set, the operation voltage of each of the power supply cells can be adjusted to a magnitude obtained by dividing the magnitude of the output voltage by 2k. In this form, since a target for dynamic control is one switching element, the configuration of the circuit is simplified and control is also simplified compared to the first aspect. In this aspect, unlike the first form, since a voltage source that is connected in parallel to the switching element is not needed, the configuration of the circuit is simplified, and the operation voltage in a case where 2k power supply cells are connected in series is obtained between the output terminals, the circuit is expected to be more effectively used.

Even in this aspect, in a case where switching of the state between both terminals of the switching element to between the electrical conduction state and the cutoff state is not performed at regular intervals, the operation voltage of each of the group of power supply cells connected in parallel to the odd-numbered group of selective electrical conduction elements is evenly adjusted to a first voltage, the operation voltage of each of the group of power supply cells connected in parallel to the even-numbered group of selective electrical conduction elements is evenly adjusted to a value obtained by multiplying the first voltage by the function of the duty ratio, and the total of the operation voltages coincides with the output voltage between the output terminals. It should be understood that this case also belongs to the scope of the present disclosure.

In a third form of the second aspect of the device of the present disclosure, each of the selective electrical conduction elements may be a rectifier unit. The circuit controller may include a primary coil of a transformer having the primary coil and a secondary coil. The first inverted voltage generation unit may be the secondary coil of the transformer. The reference voltage decision unit may be a circuit unit that generates a reference voltage, which has a magnitude discretionarily set and a direction of which is cyclically inverted, between both ends of the secondary coil of the transformer. Here, as described above, the "transformer" may be any transformer that has a magnetic circuit wound with a primary coil and a secondary coil, and is able to generate a voltage having an appropriate magnitude between both ends of the secondary coil as the operation voltage of the power supply cell. Specifically, the configuration of the primary coil side of the transformer may be a configuration of a closed circuit (any load resistor may be inserted into the circuit) having the direct-current voltage source capable of generating a voltage having any magnitude, the switching element, and the primary coil, and may be configured such that the switching element operates to repeat the electrical conduction state and the cutoff state between the negative electrode and the positive electrode of the voltage source cyclically. Then, in this form, the operation voltage of each of the power supply cells connected to the electrode connection terminal is decided based on the generated voltage between both ends of the secondary coil of the transformer, that is, the first inverted voltage generation unit and the ratio of the durations of the first phase and the second phase of the selective electrical conduction elements.

In the third form, in a case where the transformer generates a voltage, which has a magnitude discretionarily set and a direction of which is cyclically inverted, between both ends of the secondary coil, the first phase and the second phase are alternately achieved in the column of the selective electrical conduction elements including the column of the rectifier units, and as described above, the magnitude of the operation voltage of each of the power supply cells is decided such that the operation voltage of each of the group of power supply cells connected in parallel to the odd-numbered group of selective electrical conduction elements and the group of power supply cells connected in parallel to the even-numbered group of selective electrical conduction elements becomes even. In particular, when the voltage of the secondary coil is inverted at regular time intervals, as in the above-described case, the magnitude of the operation voltage of each of the power supply cells is evenly adjusted to be the same as the voltage between both ends of the secondary coil. According to the configuration as described above, since the voltage source (the voltage source on the primary coil side of the transformer) that decides the operation voltage of each of the power supply cells is electrically insulated from the power supply cells, a situation in which the circuit device can be applied is expected to be expanded. In this form, in the circuit in which the power supply cells are connected in series, a switching element that needs a control input is not present, and the entire circuit is constituted of passive electrical elements. Thus, the configuration of the circuit is simplified.

In the configuration of the third form, each of the inverted voltage generation units other than the first inverted voltage generation unit and the auxiliary inverted voltage generation units may be the secondary coil of the transformer. A generated voltage of each of the inverted voltage generation units other than the first inverted voltage generation unit and the auxiliary inverted voltage generation units may be cyclically inverted in synchronization with the first inverted voltage generation unit. In this case, since the voltage is adjusted in each inverted voltage generation unit, a circuit operation is expected to be further stabilized. On the other hand, each of the inverted voltage generation units other than the first inverted voltage generation unit and the auxiliary inverted voltage generation units may be an inductor. A generated voltage of each of the inverted voltage generation units other than the first inverted voltage generation unit and the auxiliary inverted voltage generation units may be cyclically inverted in synchronization with the first inverted voltage generation unit. In this case, since the transformer is provided at one place, the power consumption of the circuit is relatively reduced.

In the above-described third form, in a case where the direction of the generated voltage between both ends of the secondary coil is not inverted at regular intervals, the operation voltage of each of the group of power supply cells connected in parallel to the odd-numbered group of selective electrical conduction elements is adjusted evenly to a voltage when the voltage is generated in the secondary coil from the rectifier unit side toward the power supply cell side, and the operation voltage of each of the group of power supply cells connected in parallel to the even-numbered group of selective electrical conduction elements is adjusted evenly to a voltage when the voltage is generated in the secondary coil from the power supply cell side toward the rectifier unit side. It should be understood that this case also belongs to the scope of the present disclosure.

Thus, in the configuration of the present disclosure, in the operation voltage control circuit device capable of evenly adjusting the operation voltage of each of the power supply cells, such as a plurality of solar cells connected in series, in detouring a surplus of a current of each of the power supply cells when variation occurs in the operation current among the power supply cells in the configuration in which the capacitor for stabilizing the operation voltage of each of the power supply cells is provided, the delivery of the electric charges do not occur among the auxiliary capacitor, and it is possible to suppress loss accordingly. In the configuration as described above, in increasing the number of power supply cells connected in series and increasing the number of stages of the boosting and deboosting chopper circuit in the device, it is possible to achieve an increase in the number of auxiliary capacitors while suppressing an increase in loss due to the increase in the number of auxiliary capacitors. According to the configuration as described above, the operation of the power supply cells connected in series with less loss is achieved, and a scope where the operation voltage control circuit device can be advantageously used is expected to be expanded.

Other objects and advantages of the present disclosure will be apparent from the description of the following embodiments of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 10A is a characteristic diagram schematically showing changes of a generated current $I_R$ and generated power $P_R$ with respect to a generated voltage of a solar cell with various amounts of received light R (R indicates a proportion of each amount of received light in a case where the amount of received light of R=100% is 100%);

DETAILED DESCRIPTION OF EMBODIMENTS

Figure 1A:
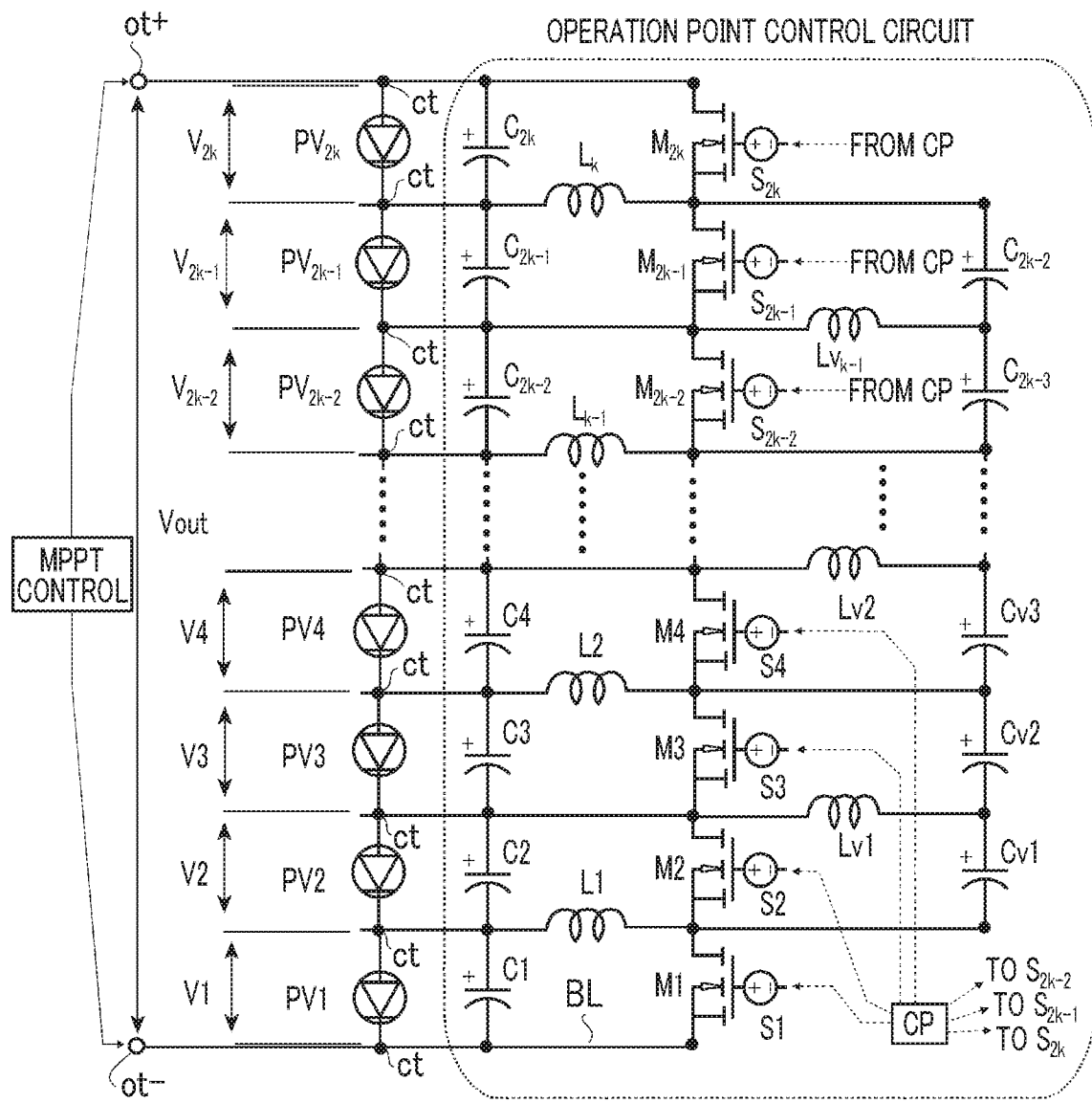
FIG. 1A is a circuit configuration diagram showing a first aspect of a power generation operation voltage control circuit device according to an embodiment (a case where 2k solar cells PVn are connected in series)

Hereinafter, the present disclosure will be described in conjunction with several embodiments referring to the accompanying drawings. In the drawings, the same reference numerals indicate the same parts.

Figure 10B:
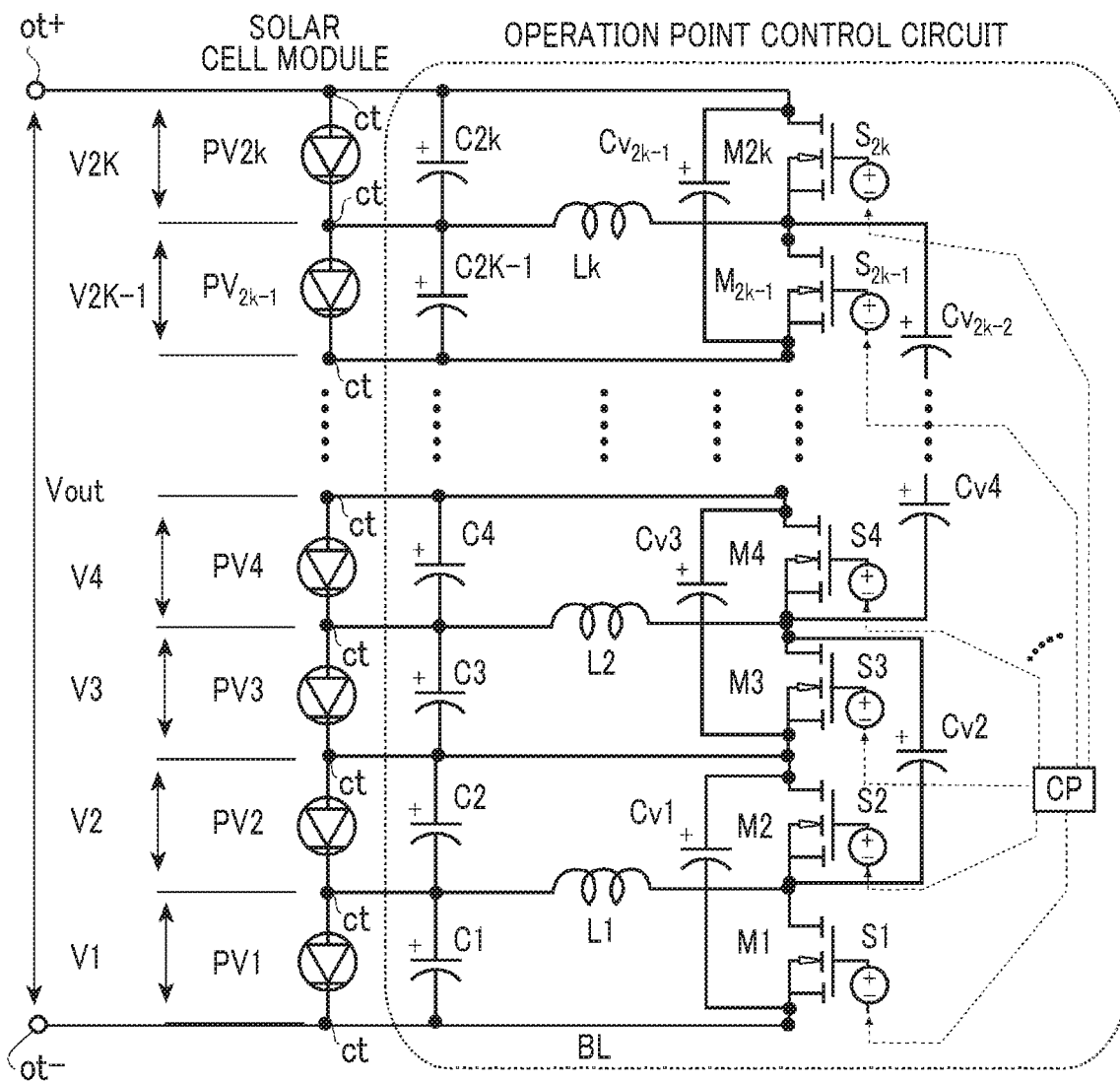
FIG. 10B shows an example of a circuit configuration diagram of a solar power generation device that has been suggested in the related art (JP 2018-038245 A or the like)

Configuration and Operation of Power Generation Operation Voltage Control Circuit Device for Solar Cell Module A power generation operation voltage control circuit device according to the embodiment that controls a power generation operation point of each cell in a solar cell module, in which a plurality of solar cells is connected in series, basically has the same configuration as a circuit in which boosting and deboosting chopper circuits, each of which controls a generated voltage of each solar cell for each solar cell and detours a surplus of a current in each solar cell (an amount more than a current decided according to a voltage and current characteristic with respect to a generated voltage of each cell in a current flowing between output terminals of the solar cell module), are connected in multi stages as illustrated in FIG. 10B. Note that, in the device of the embodiment, unlike the configuration of FIG. 10B, in order to stabilize the generated voltage of the solar cell (or the held voltage of the capacitor) of each stage, another set of boosting and deboosting chopper circuits are formed using capacitors (auxiliary capacitors) and inductors or coils (auxiliary inverted voltage generation units) of transformers with respect to respective switching units or rectifier units (selective electrical conduction units) of the boosting and deboosting chopper circuit. In the configuration, when a surplus of a current occurs in a solar cell, the surplus of the current makes a detour to the selective electrical conduction unit, to which the solar cell is connected in parallel, and the auxiliary capacitor connected in parallel to the selective electrical conduction unit and does not flow through the selective electrical conduction units and the auxiliary capacitors of other stages. Then, loss in an element, through which the surplus of the current passes when the surplus of the current of each solar cell makes a detour, is relatively reduced compared to a case where the voltage stabilization capacitors illustrated in FIG. 10B are connected, and energy efficiency is achieved. In the following description, first, loss in the circuit configuration of the related art as in FIG. 10B will be described, and next, various specific aspects of a power generation operation voltage control circuit device of an embodiment will be described.

A. Loss in Circuit Configuration of Related Art

Figure 11A:
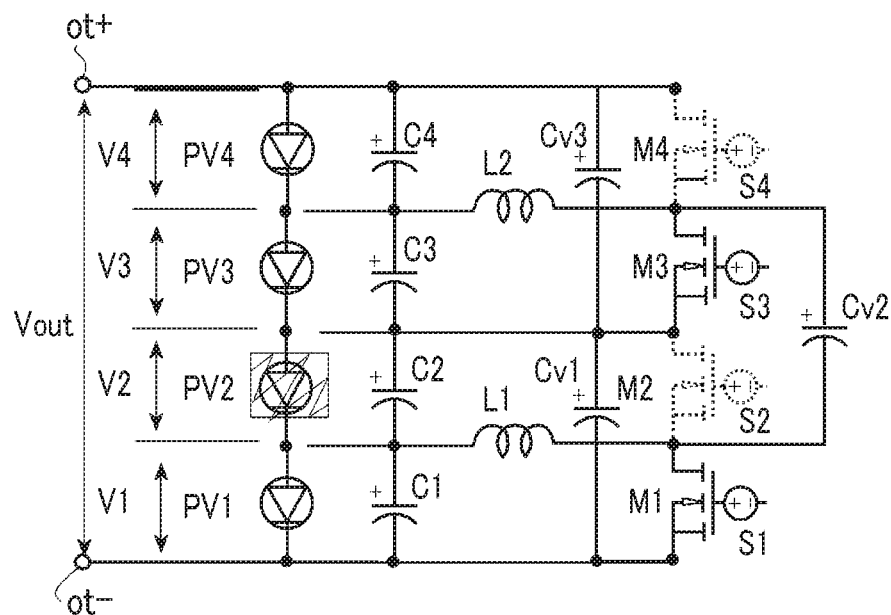
FIG. 11A is a diagram illustrating an operation state of the circuit device of FIG. 10B, and shows a state of a circuit in the phase 1.
Figure 11B:
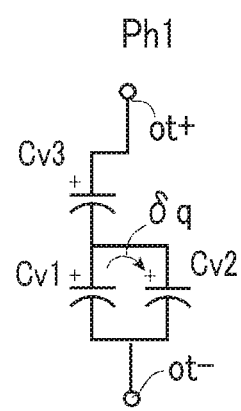
FIG. 11B is a diagram illustrating an operation state of the circuit device of FIG. 10B, and shows a connection state of voltage stabilization capacitors in the phase 1.
Figure 11C:
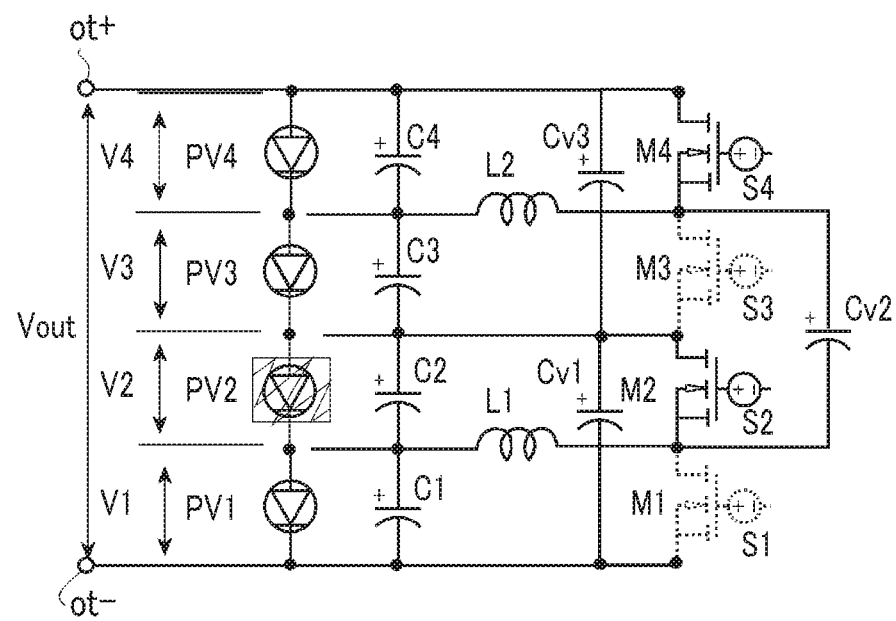
FIG. 11C is a diagram illustrating an operation state of the circuit device of FIG. 10B, and shows a state of a circuit in the phase 2.

In the circuit configuration as in FIG. 10B, electrode connection terminals ct that are connected to positive electrodes and negative electrodes of respective solar cells PVn (where n is an integer of 1 to 2k, and k is an integer equal to or greater than 2) are provided in order to connect a plurality of solar cells in series between a pair of output terminals ot+, ot−, capacitors Cn are connected to the electrode connection terminals ct in parallel with the solar cells PVn, switching units Mn as selective electrical conduction units are connected in parallel to the electrode connection terminals ct, and inductors Li (where i is an integer of 1 to k) as inverted voltage generation units are inserted into even-numbered circuit lines counted from one end (BL) of the column of the switching units Mn among circuit lines between the capacitors Cn and the switching units Mn, respectively. As shown in the drawing, voltage stabilization capacitors Cvl (where l is an integer of 1 to 2k−1) are connected in parallel to both ends of all sets of (2p-1)th and 2p-th switching units (a set of a first switching unit and a second switching unit, a set of a third switching unit and a fourth switching unit, . . . ) (where p is an integer of 1 to k) counted from one end of the column of the switching units Mn and all sets of 2q-th and (2q+1)th switching units (a set of the second switching unit and the third switching unit, . . . ) (where q is an integer of 1 to k−1), respectively. In the operation, as shown in FIGS. 11A and 11C, in a state in which a voltage Vout between the output terminals is adjusted to a desired value, a group (odd-numbered group) of odd-numbered switching units $M_{2r-1}$ and a group (even-numbered group) of even-numbered switching units $M_{2r}$ counted from a negative electrode side of the solar cell column are alternately switched between an electrical conduction state and a cutoff state in a predetermined cycle, which may be discretionarily set (where r is an integer of 1 to k). In this case, under a condition that the total of generated voltages Vn of the solar cells becomes the same as the voltage Vout between the output terminals and a condition that the generated voltages Vn of the solar cells of the stages where the switching units are simultaneously brought into the cutoff state become the same, $\Sigma Vn = Vout$ . . . (1a), $Vn^I = VI$ . . . (1b), and $Vn^{II} = VII$ . . . (1c) are established. Here, $Vn^I$ is the generated voltage Vn of each of the solar cells connected in parallel to the odd-numbered group of switching units, $Vn^{II}$ is the generated voltage Vn of each of the solar cells connected in parallel to the even-numbered group of switching units, and VI and VII are voltage values of the generated voltages of the odd-numbered group and the even-numbered group of solar cells, respectively. In a process in which a direction of a voltage generated in the inductor Li is alternately inverted in synchronization with the switching of the state of the switching unit, under a condition that electromagnetic energy accumulated in the inductor Li in an ON state of a switching unit $M_{2i-1}$ is discharged in an OFF state of the switching unit $M_{2i-1}$, when a ratio (referred to as a duty ratio) of a duration, for which an odd-numbered switching unit is brought into the cutoff state, to a predetermined cycle is d, the relationships of $VII = \alpha VI$ . . . (2a) and $\alpha = d/(1-d))$ . . . (2b) are established. Accordingly, when d=½, VI=VII . . . (2c) is established.

Figure 11D:
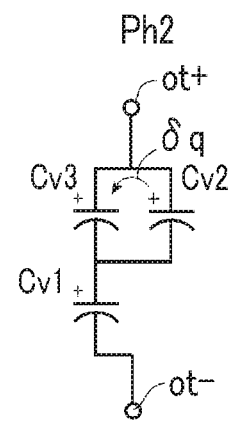
FIG. 11D is a diagram illustrating an operation state of the circuit device of FIG. 10B, and shows a connection state of the voltage stabilization capacitors in the phase 2.

In the operation of the above-described circuit configuration, the voltage stabilization capacitor Cvl functions to hold a generated voltage $V_l + V_{l+1}$ of solar cells $PV_l$, $PV_{l+1}$ connected to two corresponding switching units $M_l$, $M_{l+1}$ to be VI+VII=(1+α)VI and to stabilize the generated voltage of each of the solar cells. More specifically, as shown in FIGS. 11A and 11C, in a case where the switching unit is alternately switched between the electrical conduction state and the cutoff state, as shown in FIGS. 11B and 11D, the voltage stabilization capacitor $Cv_l$ is alternately connected in parallel to adjacent auxiliary capacitors $Cv_{l-1}$, $Cv_{l+1}$. With this, held voltages Vout/k of all auxiliary capacitors $Cv_l$ are uniformized, and the generated voltage of each of the solar cells is stably held to a value provided by Expressions (1b) and (1c) (see JP 2018-038245 A).

In the operation of the circuit configuration including the auxiliary capacitors described above, when a part of the solar cells connected in series goes into a partial shade, or the like, and a current to flow in the solar cell relatively decreases less than the currents of other solar cells, a surplus of the current corresponding to the decrease is accumulated in the voltage stabilization capacitor Cvl through the switching unit, to which the solar cell is connected in parallel, and then, as shown in FIGS. 11B and 11D, while the switching units, to which the respective auxiliary capacitors are connected in parallel, are alternately switched, electric charges (δq) corresponding to the surplus of the current are delivered sequentially among the auxiliary capacitors through the switching units. For example, in FIGS. 11A and 11C, when a solar cell PV2 goes into a partial shade, and the current to flow in the solar cell PV2 relatively decreases, a surplus δq of a current that makes a detour around the solar cell PV2 from a solar cell PV1 is accumulated in a voltage stabilization capacitor Cv1, is delivered to a voltage stabilization capacitor Cv2 when the voltage stabilization capacitor Cv1 is connected in parallel to the voltage stabilization capacitor Cv2, is further delivered to a voltage stabilization capacitor Cv3 when the voltage stabilization capacitor Cv2 is connected in parallel to the voltage stabilization capacitor Cv3, and flows out from the output terminal. That is, plainly speaking, the surplus of the current in the solar cell where the current to flow relatively decrease makes a detour around the solar cell through the whole of the switching unit column and the voltage stabilization capacitor column.

Incidentally, as described in "SUMMARY", since the capacitors have parasitic resistance and the switching units have ON resistance, as an absolute amount of a current passing through the capacitors or the switching units increases, the Joule loss increases. That is, as the number of switching units and the voltage stabilization capacitors, through which the current pass, increase, the Joule loss also increases accordingly. Accordingly, as described above, in the configuration in which the surplus of the current that makes a detour around the solar cell where the current to flow relatively decreases passes through the whole of the switching units column and the voltage stabilization capacitor column, in a case where a certain amount of surplus of the current is detoured, as the number of solar cells connected in series increases, the number of switching units and the number of voltage stabilization capacitors increase. For this reason, the Joule loss also increases. Actually, according to calculation, as in a table described below, it is understood that, in a case where the number of solar cells connected in series increases in the circuit configuration as in FIG. 10B, both of an amount of movement (per unit time) of electric charges in the whole of the voltage stabilization capacitor column (the sum of absolute values of amounts of change in electric charges) and an amount of current in the whole of the switching unit column (the sum of absolute values of currents) increase, and the Joule loss also increases.

TABLE 1

| Number of solar cells | n = 4 | n = 6 | n = 8 | n = 16 |
|---|---|---|---|---|
| Number of voltage stabilization capacitors | 3 | 5 | 7 | 15 |
| Total amount of movement of electric charges per second of voltage stabilization capacitors | 4 | 6.66 | 10 | 21 |
| Number of switching units | 4 | 6 | 8 | 16 |
| Total amount of current of switching units | 14 | 13.33 | 20 | 22.5 |

[Values in the above-described table are obtained by calculating a current flowing in each switching unit and a total amount of movement of electric charges per second of each voltage stabilization capacitor, and calculating the sums of absolute values of the respective values when an output current of each of PV2 to PVn is 5 A and an output current of PV1 is 1 A in the configuration of FIG. 10B.] In other words, as described above, in the configuration in which each of the voltage stabilization capacitors is alternately connected in parallel to a set of two adjacent switching units, loss in the switching units and the voltage stabilization capacitors due to a detour of the surplus of the current in the solar cell, in which the current to flow relatively decreases, to the switching units and the voltage stabilization capacitors increases as the number of solar cells connected in series increases.

B. Operation Voltage Control Circuit Device of Embodiment

In the circuit configuration of the related art as described above, in view of a situation in which, as the number of solar cells connected in series increases, the loss (hereinafter, referred to as "surplus current detour loss") in the switching units and the voltage stabilization capacitor due to the detour of the surplus of the current in the solar cell, in which the current to flow relatively decreases, increases, in the embodiment, an operation voltage control circuit device having a new configuration in which the surplus current detour loss does not depend on the number of solar cells connected in series is suggested. In the operation voltage control circuit device of the embodiment, as described above, plainly speaking, the auxiliary capacitor is connected in parallel to the boosting and deboosting chopper circuit of each stage (excluding the stages at both ends) in the configuration of the multi-stage boosting and deboosting chopper circuit as described above through the inductor or the coil (auxiliary inverted voltage generation unit) of the transformer. With this, so to speak, two sets of boosting and deboosting chopper circuits are formed for the respective selective electrical conduction units (the auxiliary capacitor corresponds to the voltage stabilization capacitor of the related art). Then, since the surplus of the current in the solar cell where the current to flow relatively decreases makes a detour around the solar cell through the auxiliary capacitor and the selective electrical conduction unit of the stage, to which the solar cell belongs, and does not pass through the auxiliary capacitors and the selective electrical conduction units of other stages, the surplus current detour loss does not substantially occur in the auxiliary capacitors and the selective electrical conduction units of other stages, and the surplus current detour loss does not depend on the number of solar cells connected in series. Hereinafter, specific configurations of various aspects of an operation voltage control circuit device, to which the embodiment is applied, will be described.

(a) Configuration of First Aspect

Referring to FIG. 1A, in the configuration of a first aspect of the embodiment, the circuit of the power generation operation voltage control circuit device has, as in the configuration of FIG. 10B, a pair of output terminals ot+, ot−, electrode connection terminals ct that are respectively connected to a positive electrode and a negative electrode of each solar cell PVn (where n is an integer of 1 to 2k, and k is a positive integer) in order to connect a plurality of solar cells in series between the output terminals ot+, ot−, capacitors Cn (C1, C2, . . . , $C_{2k}$) connected in parallel to the respective solar cells connected to the electrode connection terminals ct and connected in series to one another, and switching units Mn (M1, M2, . . . , $M_{2k}$), which may be MOSFETs, as selective electrical conduction units connected in parallel to the capacitors Cn and connected in series to one another. Inductors Li (L1, L2, . . . , Lk) are inserted as inverted voltage generation units into even-numbered circuit lines counted from one end (BL) of the column of the switching units among 2k+1 circuit lines between the capacitors Cn and the switching units Mn, respectively. Each of the switching units Mn operates to switch a state between both terminals of the switching unit between an electrical conduction state (ON) in which electrical conduction is provided between both terminals and a cutoff state (OFF) in which both terminals are insulated in response to a control input provided from a switching control device CP (switching controller) to a control input terminal Sn. Then, in the configuration of the embodiment, as described above, auxiliary capacitors Cvm (Cv1, Cv2, . . . , $Cv_{2k−2}$) are connected in parallel to the respective switching units Mn excluding the switching units M1, M2k at both ends of the column of the switching units Mn, and auxiliary inductors Lvj (Lv1, Lv2, . . . , $Lv_{k−1}$) are inserted as auxiliary inverted voltage generation units into even-numbered circuit lines counted from one end of the column of the switching units among 2k−1 circuit lines between the auxiliary capacitors Cvm and the switching units Mn. That is, as shown in the drawing, the inductors Li and the auxiliary inductors Lvj are alternately connected to the respective switching units Mn. The switching units, the capacitors, the auxiliary capacitors, the inductors, and the auxiliary inductors that may be used in the circuit may be elements that are normally used in the field. Then, in the configuration of the circuit of the first aspect, any voltage control device, such as an MPPT control device, which adjusts an output voltage between the output terminals ot+, ot− is provided as a reference voltage decision unit, and the output voltage Vout is controlled. In a case where a load that is connected between the output terminals ot+, ot− is a load that holds a significant voltage between both terminals thereof, such as a rechargeable battery, the output voltage Vout may be automatically decided based on the voltage held by the load (in this case, the load corresponds to the reference voltage decision unit, and for example, the output voltage has a magnitude of a load held voltage +α. α is a constant that is decided internal resistance or a charging current of the load), and such a case also belongs to the scope of the present disclosure.

(b) Operation of First Aspect

Figure 1B:
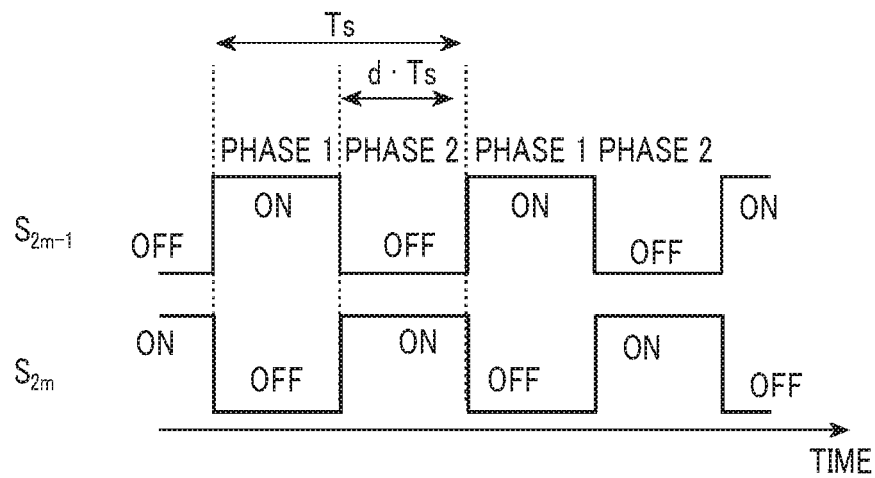
FIG. 1B shows a temporal change of a control signal provided to a control input $S_n$ of a switching unit for switching control of an electrical conduction state (ON) and a cutoff state (OFF) between both terminals of each switching unit $M_n$ in the power generation operation voltage control circuit device of FIG. 1A.

In the operation of the device of the first aspect of the embodiment described above, as in the configuration of FIG. 10B, a switching control device CP operates to provide a control command ON/OFF shown in FIG. 1B to the control input Sn of each of the switching units Mn such that a phase (ph1: a phase where a group (odd-numbered group) of odd-numbered switching units $M_{2r-1}$ counted from a negative electrode side of the solar cell column is brought into the electrical conduction state and a group (even-numbered group) of even-numbered switching units $M_{2r}$ is brought into the cutoff state) and a phase 2 (ph2: a phase where the group (odd-numbered group) of odd-numbered switching units $M_{2r-1}$ counted from the negative electrode side of the solar cell column is brought into the cutoff state and the group of (even-numbered group) of even-numbered switching units $M_{2r}$ is brought into the electrical conduction state) are alternately achieved in a predetermined cycle Ts, which may be discretionarily set (when the control command is ON, the switching unit is brought into the electrical conduction state, and when the control command is OFF, the switching unit is brought into the cutoff state). Then, as in the configuration of FIG. 10B, under a condition that the total of the generated voltages Vn of the respective solar cells becomes the same as the voltage Vout between the output terminals and a condition that the generated voltages Vn of the respective solar cells of the stages where the switching units are simultaneously brought into the OFF state become the same, Expressions (1a) to (1c) are established in a steady state, Expressions (2a) and (2b) are established at a duty ratio d, Expression (2c) is established when d=1/2, and the generated voltages of all solar cells are controlled evenly. While the switching units are operated as described above, the relationships of Expressions (1b) and (1c) are established in the held voltage of the auxiliary capacitor Cvm, when each of the switching units is in the cutoff state, the generated voltage of the corresponding solar cell connected in parallel to the auxiliary capacitor Cvm is stably held with a voltage of the auxiliary capacitor Cvm connected in parallel to the switching unit. With this, a greater tolerance is permitted regarding to characteristics, such as parasitic resistance or impedance of the solar cells or the switching units.

Figure 2A:
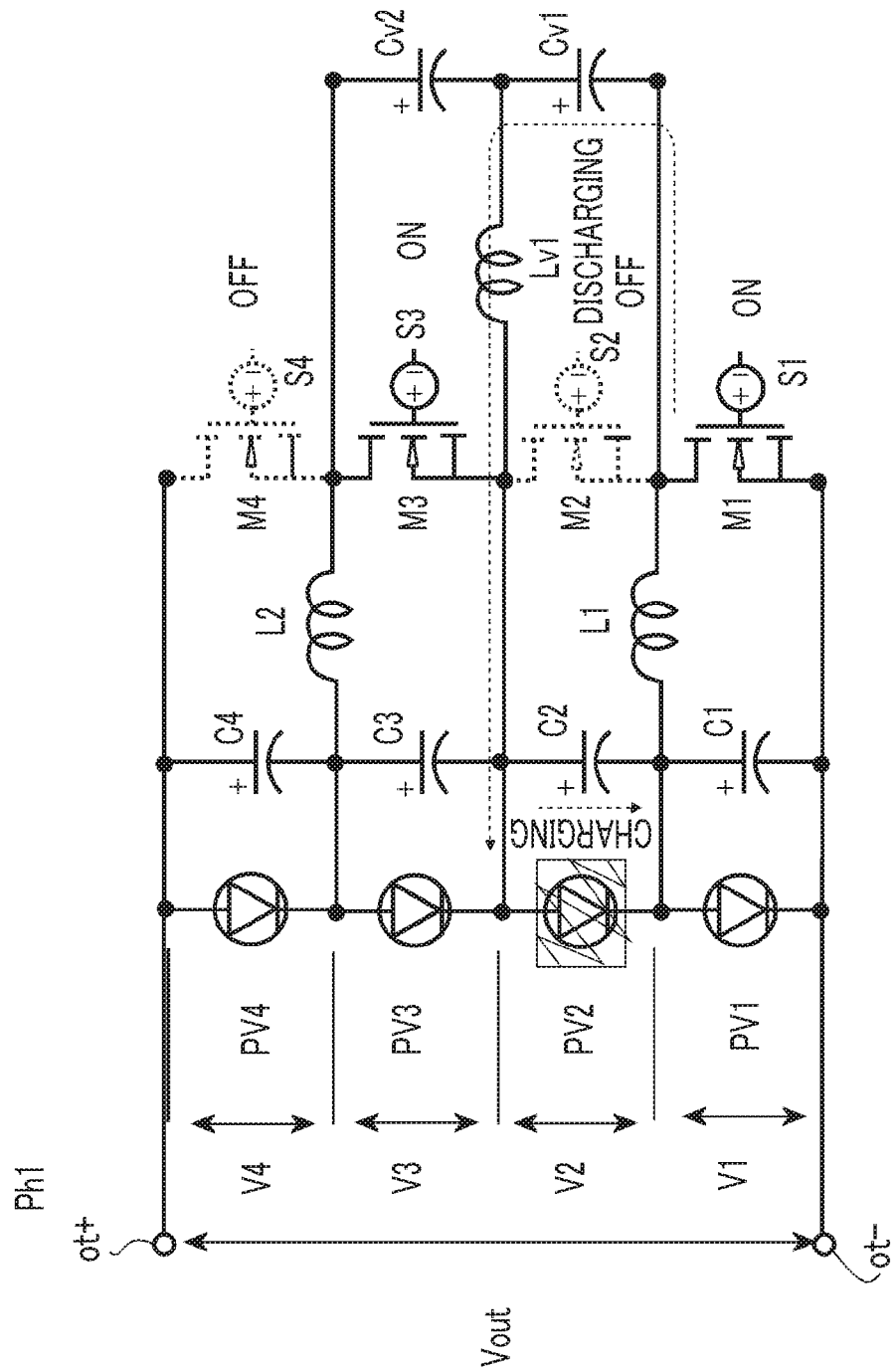
FIG. 2A is a diagram illustrating a direction in which a current flows in a case where a solar cell PV2 goes into a shade in the circuit configuration (2k=4) of FIG. 1A, and corresponds to a case of a first phase (for simplification, a switching control device (CP) and a voltage control device (MPPT control device) are not shown)
Figure 2B:
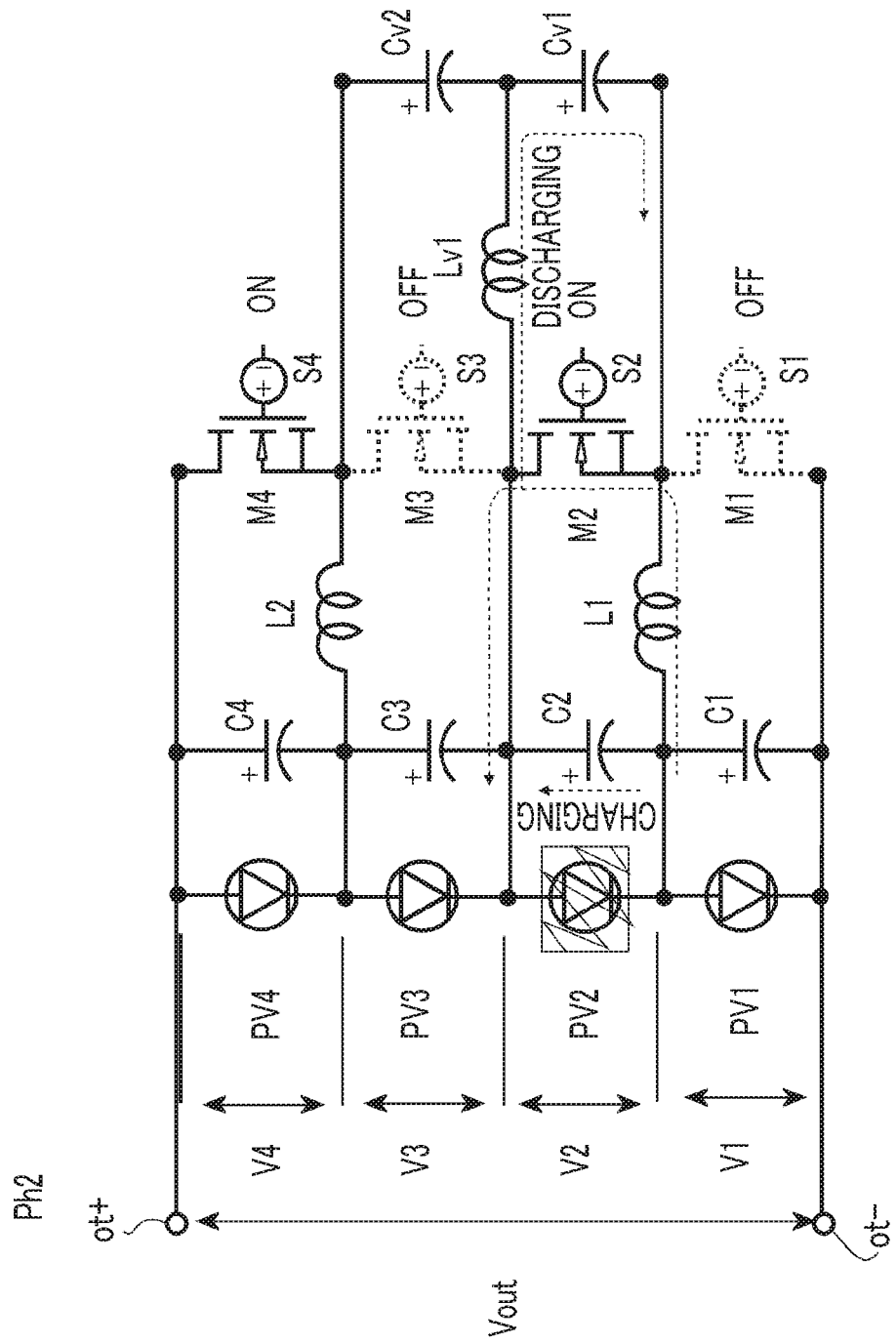
FIG. 2B is a diagram illustrating a direction in which a current flows in a case where the solar cell PV2 goes into a shade in the circuit configuration (a case of 2k=4) of FIG. 1A, and corresponds to a case of a phase 2 (for simplification, a switching control device (CP) and a voltage control device (MPPT control device) are not shown)

In the operation of the circuit configuration described above, when a part of solar cells connected in series goes into a partial shade and the current to flow in the solar cell relatively decreases less than the currents flowing other solar cells, as shown in FIGS. 2A and 2B, a surplus of the current corresponding to the decrease is accumulated in the auxiliary capacitor through the switching unit, to which the solar cell is connected in parallel, and is sent to the solar cell connected to the positive electrode side of the solar cell as it is. For example, in FIGS. 2A and 2B, when a solar cell PV2 goes into a partial shade and the current to flow in the solar cell PV2 relatively decreases, a surplus of a current that makes detour around the solar cell PV2 from a solar cell PV1 is stored in the auxiliary capacitor Cv1 in the phase 2 as shown in FIG. 2B, and then, flows to a solar cell PV3 in the phase 1 as shown in FIG. 2A. That is, plainly speaking, the surplus of the current in the solar cell where the current to flow relatively decreases passes through the switching unit and the auxiliary capacitor connected in parallel to the solar cell and makes a detour around the solar cell without passing through other switching units and auxiliary capacitors. Accordingly, according to the aspect, even though the number of switching units and the number of auxiliary capacitors connected in series increase corresponding to an increase in the number of solar cells connected in series, the surplus current detour loss is not increased, and thus, it is possible to suppress loss compared to the configuration of the related art.

Thus, in the circuit configuration as in FIG. 1A, in a case where switching of the ON and OFF of the switching unit M1 is repeated at the duty ratio d=1/2, the generated voltage Vn of each of the 2k solar cells PVn connected in series coincides with Vout/2k, and in a case where Vout/2k is made to coincide with, for example, a generated voltage Vmpp at a maximum power point of a cell having a largest amount of received light among the solar cells (see FIG. 10A), it is possible to execute the power generation operation of the solar cell module while minimizing at least one of a decrease in output or output loss due to variation in the amount of received light among the solar cells. The control of the output voltage Vout may be specifically achieved by measuring the output power, voltage, and current of the solar cell module while changing the output voltage Vout, and making the output voltage Vout coincide with a voltage at which the output power, voltage, and current of the solar cell module become maximum.

(c) Alteration Example of First Aspect

Figure 3A:
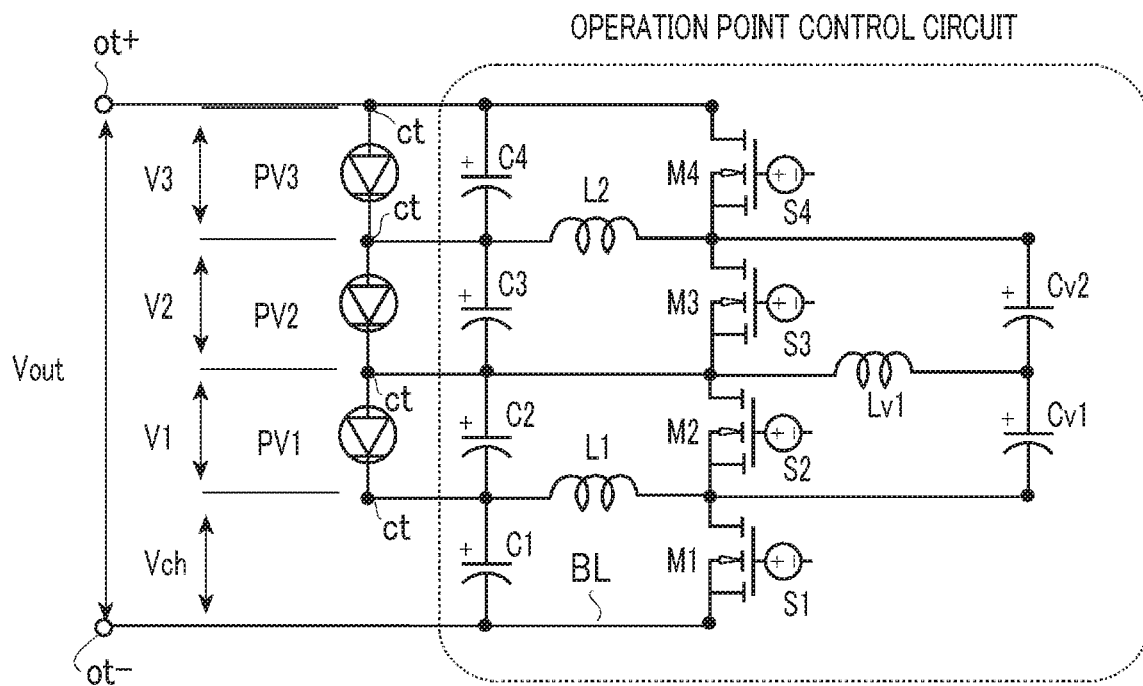
FIG. 3A is a circuit configuration diagram in a case where solar cells are not connected in parallel to a part of capacitors C in the circuit device (a case of 2k=4) of FIG. 1A (for simplification, a switching control device (CP) and a voltage control device (MPPT control device) are not shown)
Figure 3B:
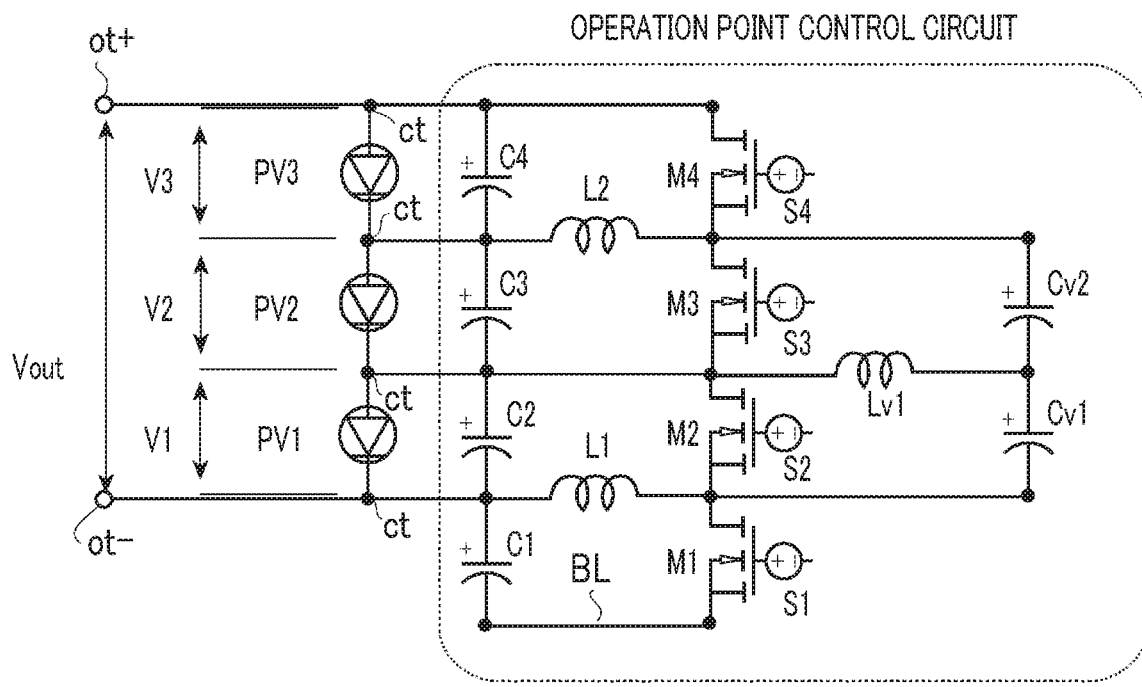
FIG. 3B is a circuit configuration diagram showing an example where output terminals are connected such that an output voltage is taken out solely from a solar cell column in a case where solar cells are not connected in parallel to a part of capacitors C in the circuit device (a case of 2k=4) of FIG. 1A (for simplification, a switching control device (CP) and a voltage control device (MPPT control device) are not shown)

In the circuit configuration as shown in FIG. 1A, the solar cells may not be connected in parallel to all capacitors Cn. That is, as illustrated in FIG. 3A, in the circuit configuration, a stage where no solar cell is connected may be present. In this case, the capacitor Cn of the stage where no solar cell is connected holds a difference between the output voltage Vout and the total ΣVn of the generated voltages Vn of the solar cells connected in series (held voltage Vch). That is, in the configuration, the output voltage of the solar cell column is boosted from the total ΣVn of the generated voltages Vn to the voltage Vout. As illustrated in FIG. 3B, in the circuit configuration, in a case where a stage where no solar cell is connected is present, the output terminals may be connected to both ends of the solar cell column, and the output voltage corresponding to the total ΣVn of the generated voltages Vn of the solar cell column may be obtained between the output terminals (the solar cells may be connected to the capacitors C1 to C3, and the output terminals may be connected to both ends of the solar cell column). The configurations may be employed when the number of solar cells is an odd number.

(d) Second Aspect

A second aspect of the operation voltage control circuit device of the embodiment has a configuration in which a part or all of the switching units in the circuit configuration of the first aspect are replaced with rectifier units, such as diodes. According to the configuration as described above, there is no need to provide a circuit for a control input of the switching unit for each solar cell, the configuration of the circuit is significantly simplified, and the operation in the control is facilitated. The configurations of various forms of the second aspect of the embodiment will be described below.

(e) Configuration of First Form of Second Aspect

Figure 4A:
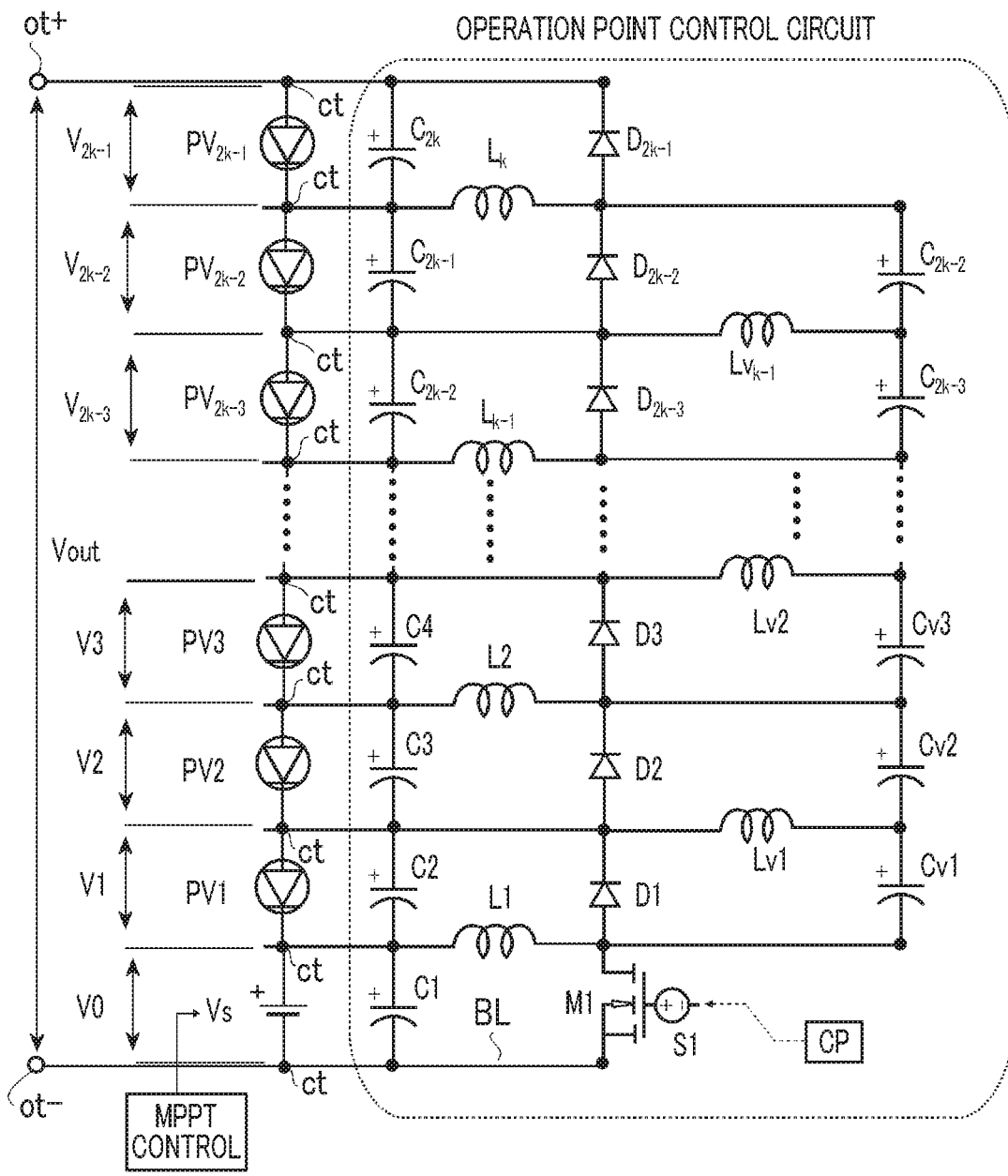
FIG. 4A is a circuit configuration diagram showing a case where a switching unit is provided on a negative electrode side of the solar cell column in a first form (a case where 2k−1 solar cells PVn are connected in series) of a second aspect of the power generation operation voltage control circuit device according to the embodiment.

In a first form of the second aspect of the embodiment, first, all switching units excluding the first switching unit in the configuration of the first aspect of the embodiment counted from the one end of the column of the switching units as shown in FIG. 1A are replaced with rectifier units. As the rectifier units, diodes Dn (D1, D2, ..., $D_{2k-1}$) are disposed such that positive electrodes and negative electrodes thereof are connected to the negative electrodes and the positive electrodes of the corresponding solar cells. Then, in this form, as a reference voltage decision unit, a voltage source Vs is connected in parallel to the capacitor connected in parallel to the switching unit and connected in series to the column of the solar cells PVn. The voltage source Vs may be configured to supply a voltage having any magnitude under the control of any voltage control device, such as an MPPT control device. Referring to FIG. 4A, when the switching unit M1 is provided on the negative electrode side of the column of the solar cells PVn, the voltage source Vs is connected in series to the negative electrode side of the column of the solar cells PVn.

(f) Operation of First Form of Second Aspect

Figure 4B:
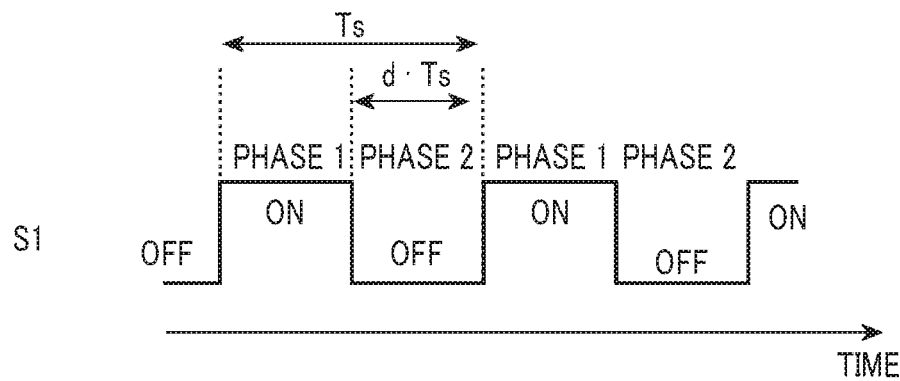
FIG. 4B shows a temporal change of a control signal provided to a control input S1 of a switching unit for switching control of the electrical conduction state (ON) and the cutoff state (OFF) between both terminals of a switching unit M1 in the power generation operation voltage control circuit device of FIG. 4A.

In the operation of the circuit configuration in which the switching unit M1 and the voltage source Vs illustrated in FIG. 4A are connected to the negative electrode side of the column of the solar cells PVn, the control command of the ON and OFF is provided from a switching control device CP to a control input S1 of the switching unit M1 in a predetermined cycle time Ts, which may be discretionarily set, as schematically shown in FIG. 4B. With this, the state of the switching unit M1 is switched between the electrical conduction state and the cutoff state. Therefore, induced electromotive force (generated voltage), the direction of which is inverted in synchronization with switching between the electrical conduction state and the cutoff state of the switching unit M1, is generated in the inductor L1 connected to the switching unit M1, and as a result of the operations of the inductors Li, the auxiliary inductors Lvj, the diodes Dn, the auxiliary capacitors Cvm, and the capacitors Cn in the circuit during a subsequent switching operation of the electrical conduction state and the cutoff state of the switching unit M1, the magnitude Vn of each of the generated voltages of all solar cells PVn is decided based on an output voltage V0 of the voltage source Vs.

In the circuit configuration of the above-described first form, a process in which the generated voltage Vn of each solar cell PVn is decided based on the output voltage V0 of the voltage source Vs during the switching operation of the electrical conduction state and the cutoff state (ON state and OFF state) of the switching unit M1 will be described as follows.

Figure 5A:
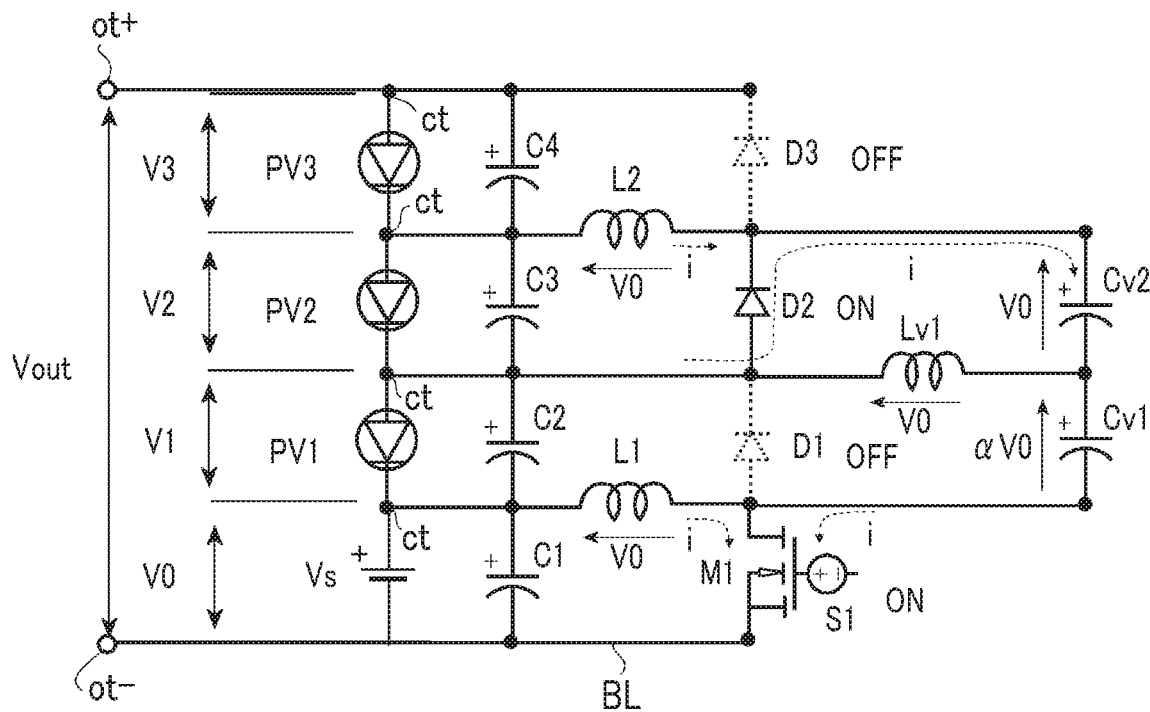
FIG. 5A is a circuit configuration diagram representing directions of a voltage and a current that are generated in each circuit element when the switching unit is in the electrical conduction state (phase 1) in the first form of the second aspect of the power generation operation voltage control circuit device of FIG. 4A (for the purpose of description, it is assumed that the number of solar cells connected in series is three (in a case where k=2))
Figure 5B:
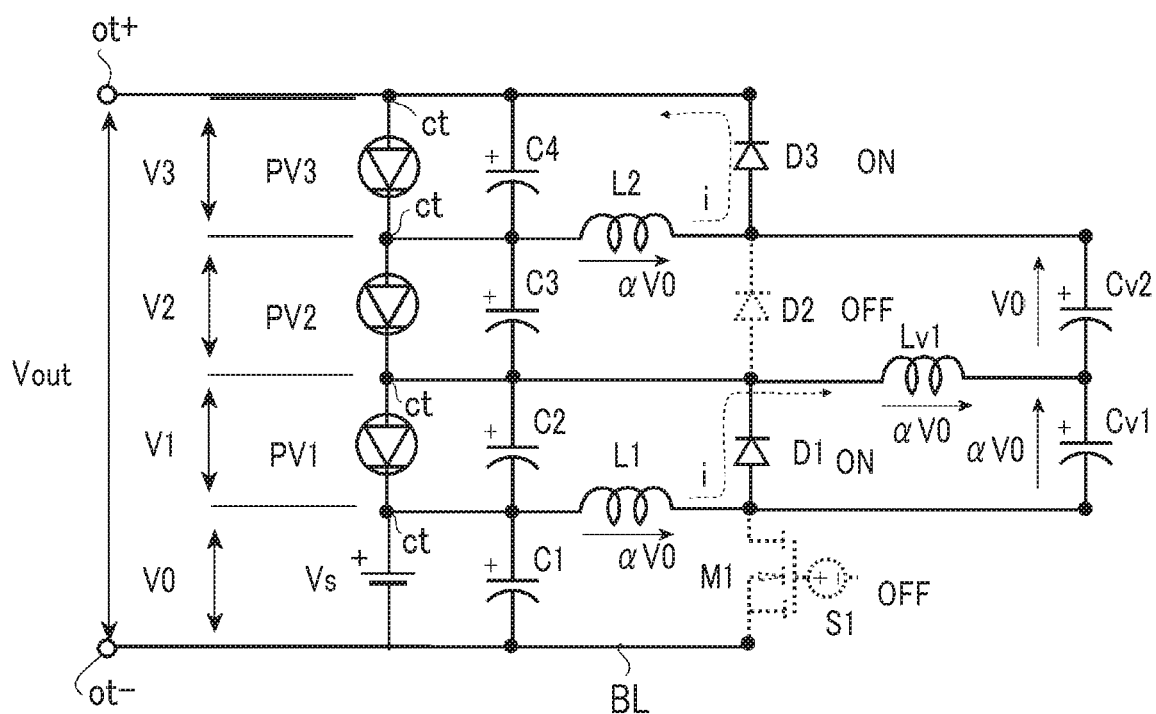
FIG. 5B is a circuit configuration diagram representing directions of a voltage and a current that are generated in each circuit element when the switching unit is in the cutoff state (phase 2) in the first form of the second aspect of the power generation operation voltage control circuit device of FIG. 4A (for the purpose of description, it is assumed that the number of solar cells connected in series is three (in a case where k=2))

Referring to FIGS. 5A and 5B, first, as in FIG. 5A, in a case where the switching unit M1 is brought into the electrical conduction state (ON), and electrical conduction is provided between both terminals of the switching unit M1, a closed loop (loop 1) from the positive electrode of the voltage source Vs to the negative electrode of the voltage source Vs through the inductor L1 and the switching unit M1 can be formed. In this case, the Kirchhoff's law is established. For this reason, as indicated by an arrow in the FIG. 5A, the induced electromotive force (generated voltage) having the same magnitude as the supply voltage V0 of the voltage source Vs is generated in the inductor L1 in a direction from the switching unit M1 toward the voltage source Vs. That is, a generated voltage Vb(L1) of the inductor L1 when the switching unit M1 is in the electrical conduction state becomes Vb(L1)=V0 ... (3a). In this case, a potential on a contact of the switching unit M1 and the positive electrode of the diode D1 is substantially the same as a potential on the negative electrode of the voltage source Vs, and the generated voltage of the inductor L1 is applied to the negative electrode of the diode D1 through the solar cell PV1. For this reason, a potential on the negative electrode of the diode D1 becomes higher than a potential on the positive electrode of the diode D1, a current does not flow in the diode D1, and the diode D1 is brought into a cutoff state (OFF). In this case, a closed loop (loop 2) from the positive electrode of the voltage source Vs to the negative electrode of the voltage source Vs through the solar cell PV1, the auxiliary inductor Lv1, the auxiliary capacitor Cv1, and the switching unit M1 can be formed. For this reason, induced electromotive force is generated in the auxiliary inductor Lv1 in a direction from the auxiliary capacitor Cv1 to the switching unit M1, and a held voltage V(Cv1) of the auxiliary capacitor Cv1 and a generated voltage Vb(Lv1) of the auxiliary inductor Lv1 (when the switching unit M1 is ON) match a generated voltage V1 of the solar cell PV1 and a generated voltage V0 of the inductor L1 according to the Kirchhoff's law. Therefore, V1+V0=V(Cv1)+Vb(Lv1) ... (3b) is established. In this case, a closed loop (loop 3) from the positive electrode of the voltage source Vs to the negative electrode of the voltage source Vs through the solar cells PV1, PV2, the inductor L2, the auxiliary capacitors Cv2, Cv1, and the switching unit M1 can be formed. For this reason, induced electromotive force is generated in the inductor L2 in a direction from the diode D2 to the capacitor C3, and a potential on the negative electrode of the diode D2 does not become higher than a potential on the positive electrode thereof. Therefore, a current is able to flow in the diode D2, and the diode D2 is brought into the electrical conduction state (ON). With this, regarding a generated voltage V2 of the solar cell PV2, a generated voltage Vb(L2) of the inductor L2 (when the switching unit M1 is ON), a held voltage V(Cv2) of the auxiliary capacitor Cv2, and the voltage Vb(Lv1) of the auxiliary inductor Lv1 (when the switching unit M1 is ON), V2=Vb(L2) ... (3c) and Vb(Lv1)=V(Cv2) ... (3d) are established according to the Kirchhoff's law. Then, in a diode D3 connected in series to the negative electrode side of the diode D2, a generated voltage Vb(L2) of the inductor L2 and a generated voltage V3 of the solar cell PV3 are applied to the negative electrode side of the diode D3, and a potential on the negative electrode side of the diode D3 is higher than a potential on the positive electrode side thereof. For this reason, a current does not flow in the diode D3, and the diode D3 is brought into the cutoff state (OFF). In this way, in a case where the switching unit M1 is brought into the electrical conduction state, the phase 1 is achieved where the odd-numbered selective electrical conduction units (the switching unit M1 and diodes $D_{2s}$ (where s is an integer of 1 to k)) counted from the negative electrode side of the solar cell column in the selective electrical conduction unit column including the switching unit M1 and the diodes Dn are brought into the electrical conduction state (ON), and the even-numbered selective electrical conduction units (diodes $D_{2s-1}$ (where s is an integer of 1 to k)) counted from the negative electrode side of the solar cell column are brought into the cutoff state (OFF).

Next, as in FIG. 5B, in a case where the switching unit M1 is brought into the cutoff state (OFF), the loops (loop 1, 2, 3) that become a current path from the auxiliary capacitor column to the voltage source Vs through the switching unit M1 are cut off. For this reason, as shown in the drawing, the direction of the induced electromotive force (generated voltage) of each of the inductors L1, Lv1, L2 is inverted. Here, under a condition that electromagnetic energy accumulated in each of the inductors in the electrical conduction state of the switching unit M1 is discharged in the cutoff state of the switching unit M1, regarding a voltage Vb before inversion and a voltage Va after inversion of the inductor, a relationship of Vb:Va=(1−d):d (where d is the duty ratio of the switching unit M1) is established. The magnitude Va of the voltage of the inductor after inversion becomes a value Va=αVb ... (4a) obtained by multiplying the voltage Vb of the inductor before inversion by the function α (=d/(1−d)) of the duty ratio. Then, the diodes D1, D3 that are in the cutoff state (OFF) until then and are the even-numbered selective electrical conduction units counted from the negative electrode side of the solar cell column is brought into the electrical conduction state (ON) since the potential on the positive electrode side of each diode becomes high due to the induced electromotive force of the inductor Li and does not become lower than the potential on the negative electrode of each diode. On the other hand, the diode D2 that is in the electrical conduction state (ON) until then and is the odd-numbered selective electrical conduction unit counted from the negative electrode side of the solar cell column is brought into the cutoff state (OFF) since the generated voltage of the solar cell PV2 or the held voltage of the auxiliary capacitor and the induced electromotive force of the inductor L2 and the auxiliary inductor Lv1 are applied to the negative electrode side of the diode, and the potential on the positive electrode side of the diode become lower than the potential on the negative electrode side of the diode. In this way, in a case where the switching unit M1 is OFF, the phase 2 is achieved where the odd-numbered selective electrical conduction units (the switching unit M1 and the diodes $D_{2s}$) counted from the negative electrode side of the solar cell column in the selective electrical conduction unit column including the switching unit M1 and the diodes Dn are brought into the cutoff state (OFF), and the even-numbered selective electrical conduction units (the diodes $D_{2s-1}$) counted from the negative electrode side of the solar cell column are brought into the electrical conduction state (ON). Then, when the states of the selective electrical conduction units are changed, regarding the generated voltages V1, V2, V3 of the solar cells PV1, PV2, PV3, the held voltages V(Cv1), V(Cv2) of the auxiliary capacitors Cv1, Cv2, and the generated voltages Va(L1), Va(L2), Va(Lv1) of the inductors L1, L2, Lv1 (when the switching units are OFF), the following relationships are established according to the Kirchhoff's law.

$$V1=Va(L1) \quad (4b)$$

$$V(Cv1)=Va(Lv1) \quad (4c)$$

$$V2+Va(L2)=Va(Lv1)+V(Cv2) \quad (4d)$$

$$V3=Va(L2) \quad (4e)$$

Thus, in a case where the relational expressions (3a) to (4e) listed above are arranged, as also shown in FIGS. 5A and 5B, the voltages that are generated in the respective units and elements in the circuit configuration are as follows.

$$V2=V(Cv2)=Vb(L1)=Vb(L2)=Vb(Lv1)=V0 \quad (5a)$$

$$V1=V3=V(Cv1)=Va(L1)=Va(L2)=Va(Lv1)=\alpha V0 \quad (5b)$$

Then, when d=½, α=1, and the generated voltages V1, V2, V3 of the solar cells PV1, PV2, PV3 are evenly controlled to the supply voltage V0 of the voltage source. In the drawings, for simplification, although a case where the number of selective electrical conduction units is four has been described, as will be understood by those skilled in the art, even though the number of selective electrical conduction units increases, when the switching unit M1 is ON, the phase 1 is achieved, and when the switching unit M1 is OFF, the phase 2 is achieved. Such a case also belongs to the scope of the present disclosure. That is, the generated voltages of the solar cells are as described below.

$$Vn^I=V0 \quad (5c)$$

$$Vn^{II}=\alpha V0 \quad (5d)$$

Here, $Vn^I$ is the generated voltage Vn of each of the solar cells connected in parallel to the odd-numbered selective electrical conduction unit counted from the negative electrode side of the solar cell column, and $Vn^{II}$ is the generated voltage Vn of each of the solar cells connected in parallel to the even-numbered selective electrical conduction unit counted from the negative electrode side of the solar cell column.

In the configuration as shown in FIG. 4A, in a case the supply voltage V0 of the voltage source Vs is made to coincide with, for example, a generated voltage Vmpp at the maximum power point of the cell having the largest amount of received light among a plurality of solar cells with the duty ratio d=1/2 (see FIG. 10A), as in FIG. 1A, it is possible to execute the power generation operation of the solar cell module while minimizing at least one of a decrease in output or output loss due to the variation of the amount of received light among the solar cells. The control of the supply voltage V0 of the voltage source Vs may be achieved by, specifically, measuring the output power, the voltage, and the current of the solar cell module, and making the supply voltage V0 coincide with a voltage, at which the output power, the voltage, and the current of the solar cell module become maximum, while changing the supply voltage V0.

In the circuit configuration of the first form of the second aspect of the embodiment illustrated in FIG. 4A, similarly to the circuit configuration of FIG. 1A, even though a part of solar cells goes into a partial shade, or the like, and the current to flow in the solar cell relatively decreases less than the currents of other solar cells, a surplus of the current corresponding to the decrease is accumulated in the auxiliary capacitor through the switching unit, to which the solar cell is connected in parallel, and is sent to a solar cell connected to the positive electrode side of the solar cell as it is without passing through other switching units and auxiliary capacitors. For this reason, as sin the first aspect, even though the number of switching units and the number of auxiliary capacitors connected in series increase corresponding to an increase in the number of solar cells connected in series, the surplus current detour loss is not increased, and it possible to suppress loss compared to the configuration of the related art.

(g) Modification Example of First Form of Second Aspect

Figure 6A:
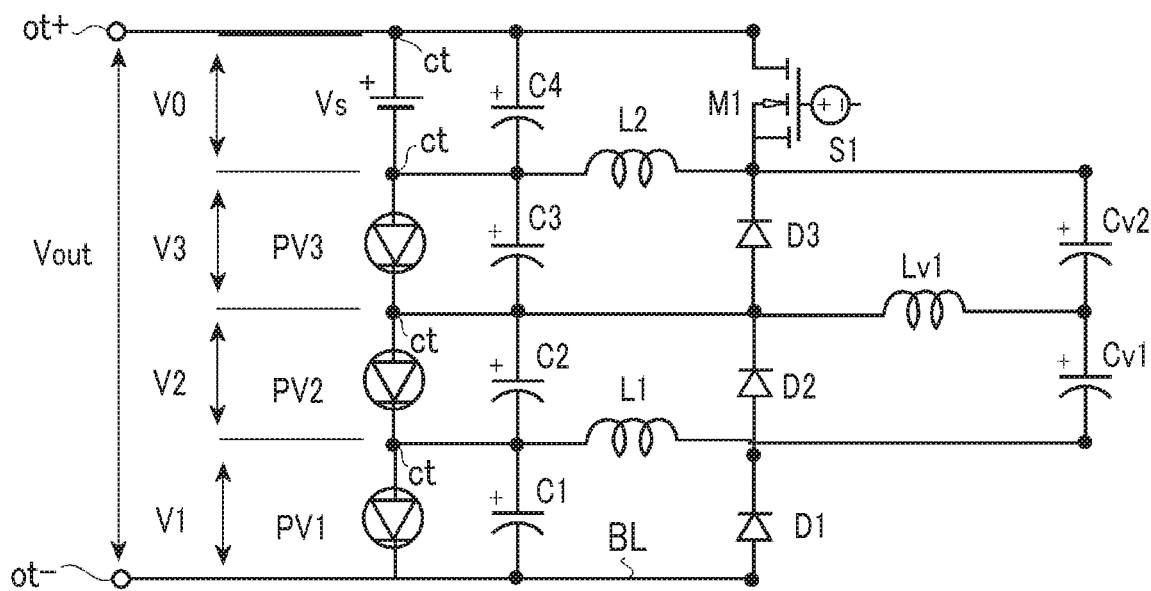
FIG. 6A is a circuit configuration diagram showing a case where the switching unit is provided on a positive electrode side of the solar cell column in the first form (a case where the 2k−1 solar cells PVn are connected in series) of the second aspect of the power generation operation voltage control circuit device according to the embodiment.
Figure 6B:
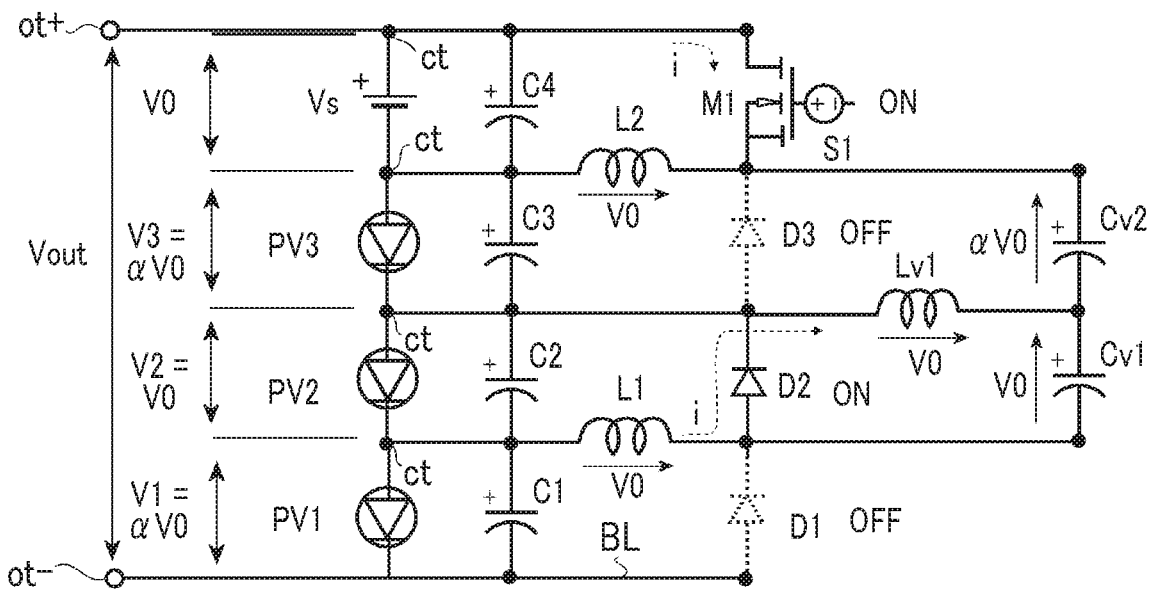
FIG. 6B is a circuit configuration diagram representing directions of a voltage and a current that are generated in each circuit element when the switching unit is in the electrical conduction state (phase 2) in the form of FIG. 6A (for the purpose of description, it is assumed that the number of solar cells connected in series is three (in a case where k=2))
Figure 6C:
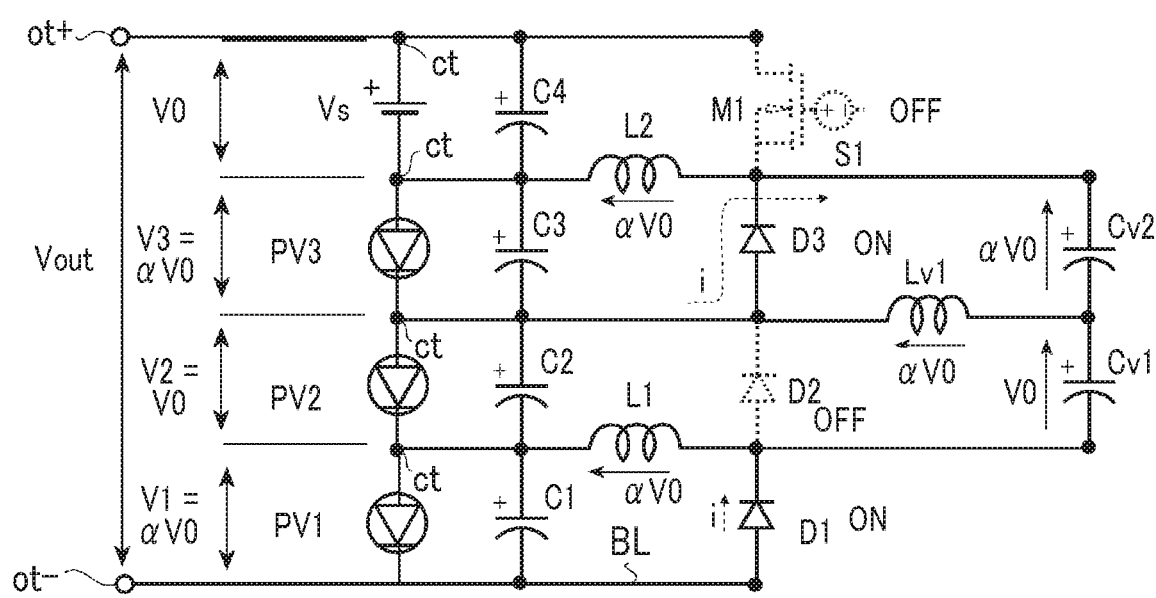
FIG. 6C is a circuit configuration diagram representing directions of a voltage and a current that are generated in each circuit element when the switching unit is in the cutoff state (phase 1) in the form of FIG. 6A (for the purpose of description, it is assumed that the number of solar cells connected in series is three (in a case where k=2))

In one modification example of the circuit configuration illustrated in FIG. 4A, as shown in FIG. 6A, the switching unit M1 and the voltage source Vs may be provided on the positive electrode side of the solar cell column. That is, in this form, the switching unit M1 is connected in series to the positive electrode side of the column of the diodes Dn connected in series, and the voltage source Vs is connected to the positive electrode side of the column of the solar cells PVn connected in series. In the form of FIG. 6A, since the switching unit M1 becomes the even-numbered selective electrical conduction unit counted from the negative electrode side of the solar cell column in the selective electrical conduction unit column, when the switching unit M1 is OFF, the phase 1 is achieved, and when the switching unit M1 is ON, the phase 2 is achieved. In the operation, in a case where the duty ratio of the switching unit M1 is d and α=d/(1−d), when the switching unit M1 is ON, as shown in FIG. 6B, induced electromotive force having the same as the magnitude of the supply voltage V0 of the voltage source Vs is generated in the inductors L1, L2 in a direction from the solar cell side to the diode and in the auxiliary inductor Lv1 in a direction from the diode to the auxiliary capacitor. When the switching unit M1 is OFF, as shown in FIG. 6C, induced electromotive force, which has a magnitude of αV0 and a direction of which is inverted, is generated in each of the inductors. Then, the voltages that are generated in the respective units and elements in the circuit configuration are as follows.

$$V2 = V(Cv1) = V0 \quad (6a)$$

$$V1 = V3 = V(Cv2) = \alpha V0 \quad (6b)$$

In the drawing, for simplification, although a case where the number of selective electrical conduction units is four, as will be understood by those skilled in the art, the circuit device operates in the same manner even though the number of selective electrical conduction units increases, and such a case also belongs to the scope of the present disclosure. That is, the generated voltages of the solar cells are as described below.

$$Vn^I = \alpha V0 \quad (6c)$$

$$Vn^{II} = V0 \quad (6d)$$

Figure 7A:
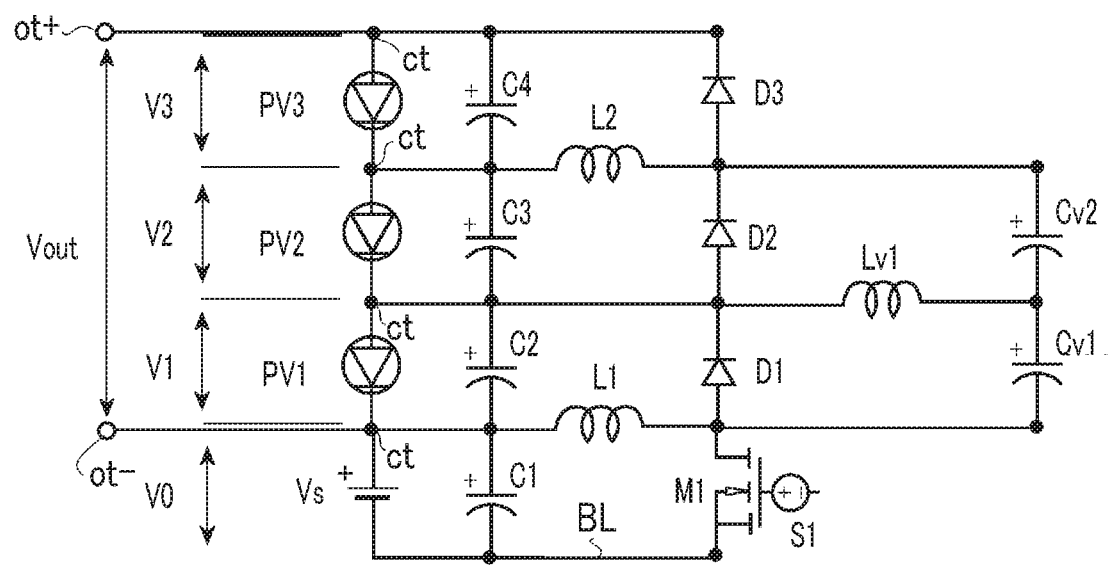
FIG. 7A is a circuit configuration diagram showing a case where a voltage source is provided outside between the output terminals in the first form of the second aspect of the power generation operation voltage control circuit device according to the embodiment.

In the circuit configuration illustrated in FIG. 4A, the solar cells may not be connected to all capacitors (not shown). As shown in FIG. 7A, solely the solar cell column may be attached between the output terminals ot+, ot−, and the voltage source Vs may be disposed outside between the output terminals ot+, ot− (the voltage source Vs and the switching unit M1 may be connected to the negative electrode side of the solar cell column or may be connected to the positive electrode side of the solar cell column, and in both cases, the circuit device operates in the same manner).

(h) Second Form of Second Aspect

Figure 7B:
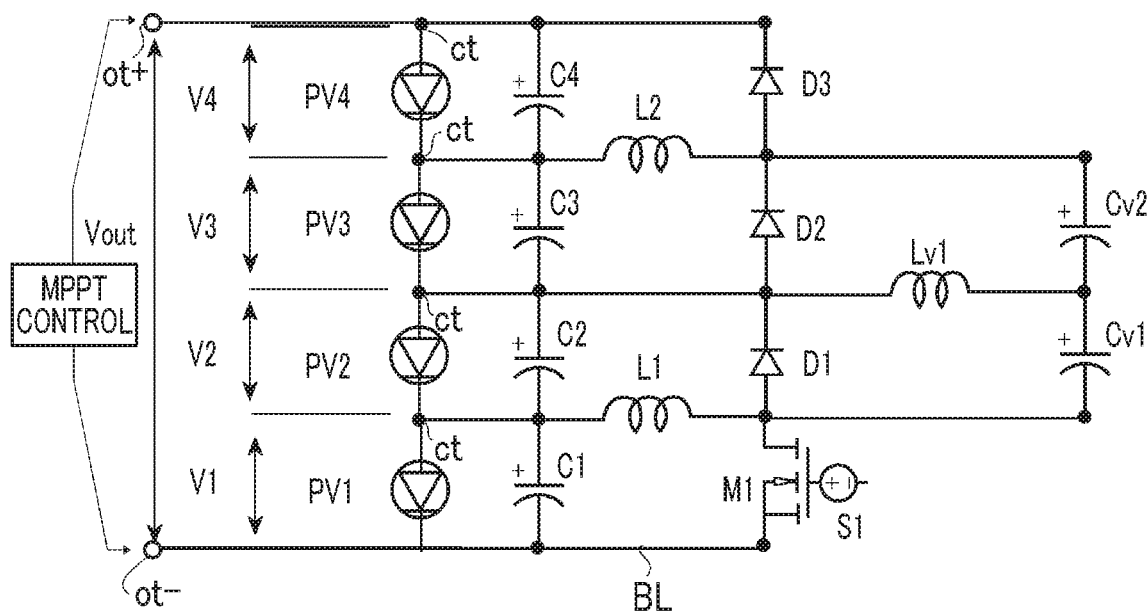
FIG. 7B is a circuit configuration diagram of a second form (a case where the 2k solar cells PVn are connected in series) of the second aspect of the power generation operation voltage control circuit device according to the embodiment (for the purpose of description, when k=2)

In a second form of the second aspect of the embodiment, the voltage source Vs in the configuration illustrated in FIG. 4A is not used, as in FIG. 7B, any voltage control device, such as an MPPT control device, which adjusts the output voltage between the output terminals ot+, ot− is provided as a reference voltage decision unit, and the output voltage Vout is controlled. As in the first aspect, when a load that is connected between the output terminals ot+, ot− is a load that holds a significant voltage between both terminals thereof, such as a rechargeable battery, the load may become a reference voltage decision unit, and output voltage Vout may be automatically decided based on the voltage held by the load. Then, the solar cell may be connected in parallel to the switching unit M1 (that is, the solar cells may be connected in parallel to all selective electrical conduction units, respectively, and may be connected in series to one another). The operation is the same as in the first form excluding that the total ΣVn of the generated voltages Vn of the respective solar cells PVn becomes the output voltage Vout having a magnitude discretionarily set or a magnitude decided based on the load voltage. When the number of solar cells is 2k, in a case where the switching units are connected to the negative electrode side of the solar cell column, the generated voltages of the solar cells become $Vn^I = Vout/(1+\alpha)k$ ... (7a) and $Vn^{II} = \alpha Vout/(1+\alpha)k$ ... (7b). On the other hand, in a case where the switching units are connected to the positive electrode side of the solar cell column, the generated voltages of the solar cells become $Vn^I = \alpha Vout/(1+\alpha)k$ ... (7c) and $Vn^{II} = Vout/(1+\alpha)k$ ... (7d). In the circuit configuration of the second form of the second aspect of the embodiment illustrated in FIG. 7B, the solar cells may not be connected to all capacitors Cn (not shown). In the drawing, for simplification, although a case where the number of selective electrical conduction units is four has been described, as will be understood by those skilled in the art, the circuit device operates in the same manner even though the number of selective electrical conduction units increases, and such a case also belongs to the scope of the present disclosure.

In the circuit configuration of the second form illustrated in FIG. 7B, similarly to the circuit configuration of FIG. 1A, when a part of solar cells goes into a partial shade, or the like, and the current to flow in the solar cell relatively decreases less than the currents of other solar cells, a surplus of the current corresponding to the decrease is accumulated in the auxiliary capacitor through the switching unit, to which the solar cell is connected in parallel, and then, is sent to a solar cell connected to the positive electrode side of the solar cell as it is without passing through other switching units and auxiliary capacitors. For this reason, as in the first aspect, even though the number of switching units and the number of auxiliary capacitors connected in series increase corresponding to an increase in the number of solar cells connected in series, the surplus current detour loss is not increased, and it is possible to suppress loss compared to the configuration of the related art.

(i) Third Form of Second Aspect

Figure 8A:
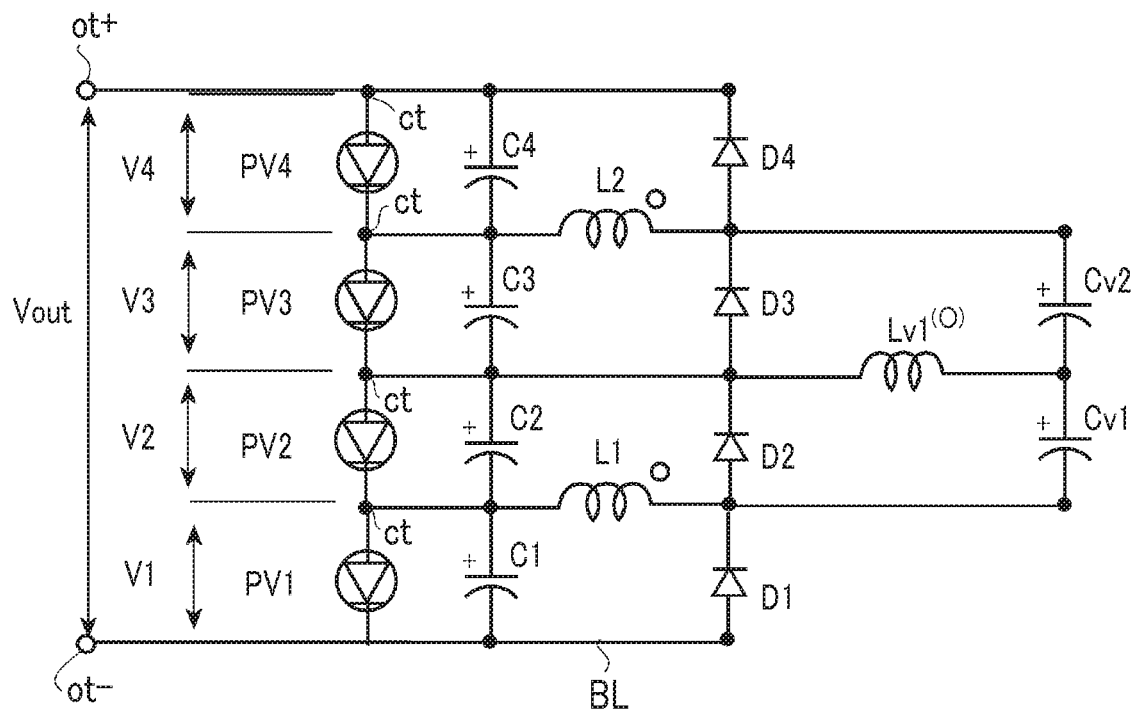
FIG. 8A is a circuit configuration diagram showing a third form (a case where the 2k solar cells PVn are connected in series) of the second aspect of the power generation operation voltage control circuit device according to the embodiment.

Referring to FIG. 8A, in the configuration of a third form of the second aspect of the embodiment, the switching unit M1 of the circuit configuration of the first form of the second aspect illustrated in FIG. 4A may be replaced with a diode, the whole of the column of the selective electrical conduction units may become a column of diodes connected in series, the voltage source Vs may not be used, and the solar cells may be connected in parallel to the respective diodes.

Figure 8B:
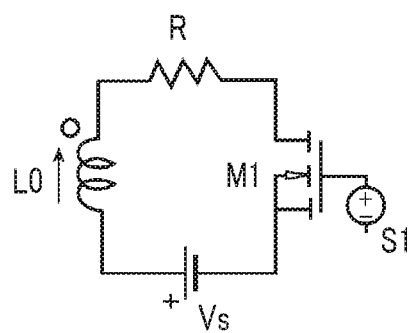
FIG. 8B is a circuit configuration diagram of a primary coil side of a transformer that generates a voltage in a secondary coil of the transformer to be used as an inverted voltage generation unit in the circuit of FIG. 8A.
Figure 8C:
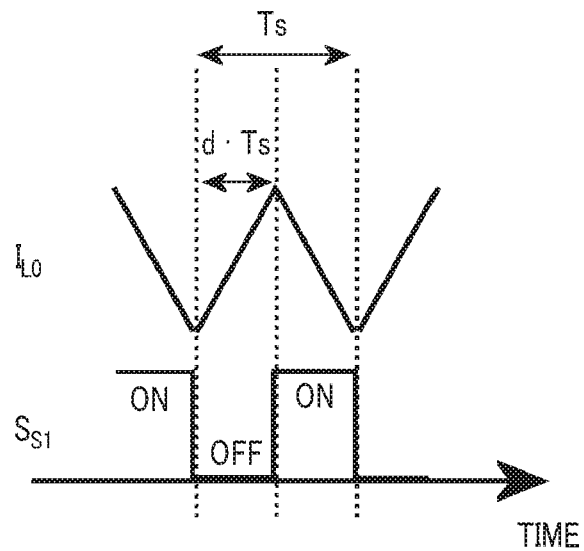
FIG. 8C shows temporal changes of a control signal $S_1$ provided to the control input $S_1$ of the switching unit for switching control of the electrical conduction state (ON) and the cutoff state (OFF) between both terminals of the switching unit and a ripple current $I_{L0}$ flowing in a primary coil L0 in a primary coil circuit of the transformer of FIG. 8B.

Then, a secondary coil of a transformer is used as an inverted voltage generation unit in a portion where the inductor Li is disposed in the circuit configuration of the first form. As illustrated in FIG. 8B, the secondary coil of the transformer is magnetically coupled to a primary coil in a primary coil circuit of the transformer through a magnetic circuit (not shown). The primary coil circuit of the transformer may be a circuit in which a primary coil L0, the voltage source Vs, the switching unit M1, and a resistor R form a closed loop. As the electrical conduction state and the cutoff state (ON and OFF) between both terminals of the switching unit M1 are cyclically switched, a current flowing from the voltage source Vs into the primary coil L0 is changed. With this, a magnetic flux that is generated in the primary coil L0 is changed, the change in magnetic flux is transmitted to the secondary coil Li by way of the magnetic circuit, and electromotive force is generated in the secondary coil Li. As schematically shown in FIG. 8C, the switching unit M1 receives, from the control input S1, the control signal in which the ON state and the OFF state are cyclically changed at any duty ratio d in a predetermined cycle time Ts, which may be discretionarily set. With this, when the control signal is ON, the electrical conduction state is brought between both terminals of the switching unit M1, and when the control signal is OFF, the cutoff state is brought between both terminals of the switching unit M1. As the inverted voltage generation units, all secondary coils Li connected to the positive electrodes of the odd-numbered solar cells counted from the negative electrode side of the column of the solar cells are disposed such that the directions are coincident (in the drawing, see o mark). Each of the auxiliary inverted voltage generation unit Lvj may be an inductor or a secondary coil of a transformer. When the auxiliary inverted voltage generation unit is the secondary coil of the transformer, the auxiliary inverted voltage generation unit is disposed such that the direction coincides with the direction of the secondary coil Li of the inverted voltage generation unit (such that the voltage is generated in a direction opposite to the diode column). As the transformer that is used in this form, any transformer in which a voltage in a range of a magnitude usable as the generated voltage of the solar cell is generated in the secondary coil, and a voltage can be inverted in a cycle requested as the inverted voltage generation unit in the embodiment may be used. Thus, in this form, the primary coil circuit of the transformer and the voltage source Vs may function as a circuit controller and a reference voltage decision unit, respectively.

In the operation, as shown in a lower side of FIG. 8C, in a case where the ON and OFF of the switching unit M1 are cyclically changed at the duty ratio d in the primary coil circuit of the transformer of FIG. 8B, as shown in an upper side of FIG. 8C, a ripple current flows into the primary coil, and electromotive force, which is cyclically inverted, is generated in the secondary coil. Here, when the switching unit M1 is ON, in FIG. 8B, electromotive force is generated downward in the primary coil. With this, in the secondary coil Li of FIG. 8A, electromotive force Vb is generated leftward, that is, in a direction from the column of the diodes toward the column of the solar cells. In this case, the generated voltages Vn of the odd-numbered solar cells PVn counted from the negative electrode side of the column of the solar cells become the same as the generated voltage Vb of the secondary coil Li according to the Kirchhoff's law. Since the odd-numbered diodes counted from the negative electrode side of the solar cell column are in the electrical conduction state, and the even-numbered diodes counted from the negative electrode side of the solar cell column are in the cutoff state, the phase 1 is implemented. On the other hand, when the switching unit M1 is OFF, in FIG. 8B, electromotive force is generated upward in the primary coil. With this, in the secondary coil Li of FIG. 8A, electromotive force Va is generated rightward, that is, in a direction from the column of the solar cells toward the column of the diodes. In this case, since the even-numbered diodes Dn counted from the negative electrode side of the column of the solar cells are in the electrical conduction state, the odd-numbered diodes Dn are in the cutoff state, the phase 2 is implemented, and the generated voltage Vn of the even-numbered solar cells PVn counted from the negative electrode side of the column of the solar cells become the same as the generated voltage Va of the secondary coil Lm according to the Kirchhoff's law. Here, as in the circuit configurations of the above-described aspects, under a condition that electromagnetic energy accumulated in the primary coil L0 and the secondary coil Li in the electrical conduction state of the switching unit M1 is discharged in the cutoff state of the switching unit M1, the voltage Vb of the secondary coil Li in the electrical conduction state of the switching unit M1 and the voltage Va of the secondary coil Li in the cutoff state of the switching unit M1 establish a relationship of Vb:Va=(1−d):d. As a result, Va=αVb is established, and thus, the generated voltages Vn of the odd-numbered solar cells PVn counted from the negative electrode side of the column of the solar cells are adjusted evenly to Vb. The generated voltages Vn of the even-numbered solar cells PVn counted from the negative electrode side of the column of the solar cells are adjusted evenly to αVb. In addition, when the duty ratio d=1/2, the generated voltages Vn of the solar cells PVn become the same as the generated voltage Vb of the secondary coil Li evenly. A relationship of L0:Li=Vs:Vb is established among inductance L0 of the primary coil, inductance Li of the secondary coil of the transformer, and electromotive force. As a result, the generated voltages Vn of the solar cells PVn are provided by Vn=Li/L0 Vs ... (8) using a voltage source voltage Vs of the primary coil circuit. In the drawing, for simplification, although a case where the number of selective electrical conduction units is four has been described, as will be understood by those skilled in the art, the circuit device operates in the same manner even though the number of selective electrical conduction units increases, and such a case also belongs to the scope of the present disclosure.

In the circuit configuration of the third form illustrated in FIG. 8A, similarly to the circuit configuration of FIG. 1A, when a part of solar cells goes into a partial shade, or the like, and the current to flow in the solar cell relatively decreases less than the currents of other solar cells, a surplus of the current corresponding to the decrease is accumulated in the auxiliary capacitor through the switching unit, to which the solar cell is connected in parallel, and then, is sent to a solar cell connected to the positive electrode side of the solar cell as it is without passing through other switching units and auxiliary capacitors. For this reason, as in the first aspect, even though the number of switching units and the number of auxiliary capacitors connected in series increase corresponding to an increase in the number of solar cells connected in series, the surplus current detour loss is not increased, and it possible to suppress loss compared to the configuration of the related art.

In the above-described third form, a switching unit that needs a control input is not present in the circuit, in which the solar cells are connected in series, and the entire circuit is constituted of passive diodes. For this reason, there is no need to prepare a circuit that supplies a control input in the operation voltage control circuit, and a wiring structure in the circuit is simplified. In addition, the power supply is in the primary coil circuit of the transformer, and the solar cells are electrically insulated from the voltage source. For this reason, even in an environment in which the solar cell module and the power supply are not grounded in common, the circuit device can be used, and a situation in which the circuit device can be applied is expected to be expanded.

Figure 8D:
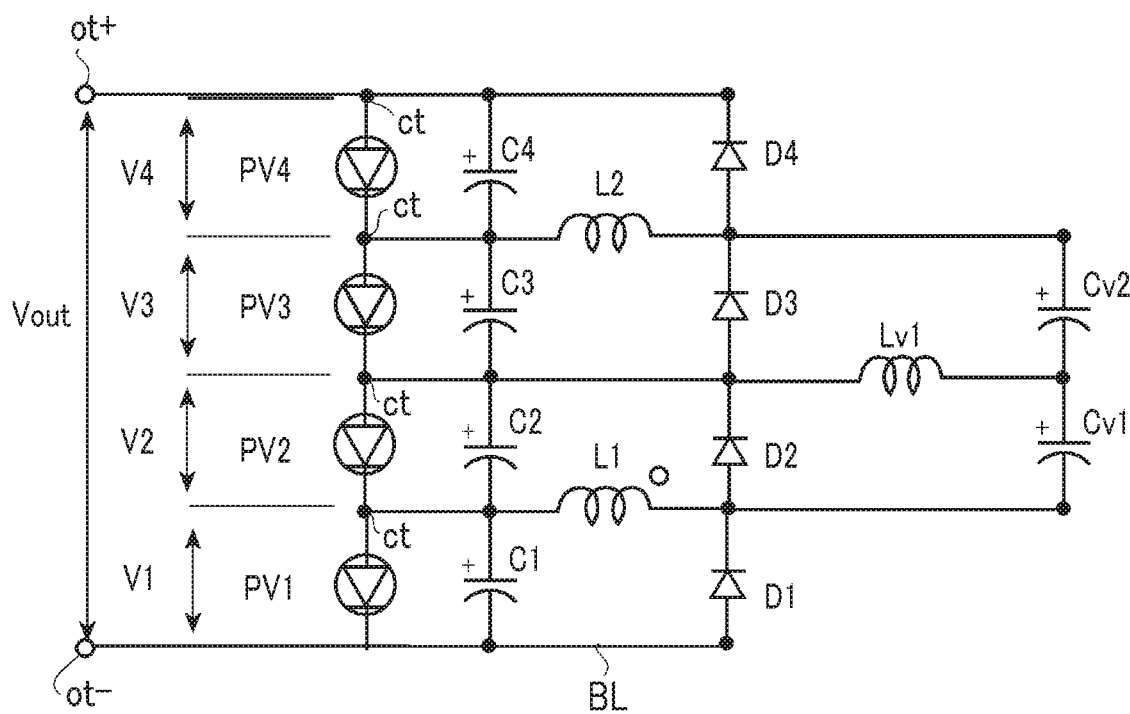
FIG. 8D shows a case where an inductor is employed as an inverted voltage generation unit other than a first inverted voltage generation unit in the circuit configuration of FIG. 8A.

In the configuration of the third form described above, as shown in FIG. 8D, the secondary coil of the transformer may be used solely for the first inverted voltage generation unit counted from any end of the diode column among the inverted voltage generation units (first group) may be the transformer, and other inverted voltage generation units may be inductors. In this case, in a case where the generated voltage of the secondary coil L1 (or Lk) is cyclically inverted as described above, the phase 1 and the phase 2 are achieved and the voltage of each solar cell is controlled in the same manner as described above. In this configuration, since the secondary coil of the transformer is used at one place in the operation voltage control circuit, power consumption needed for the operation of the circuit is reduced compared to the circuit of FIG. 8A.

Figure 9A:
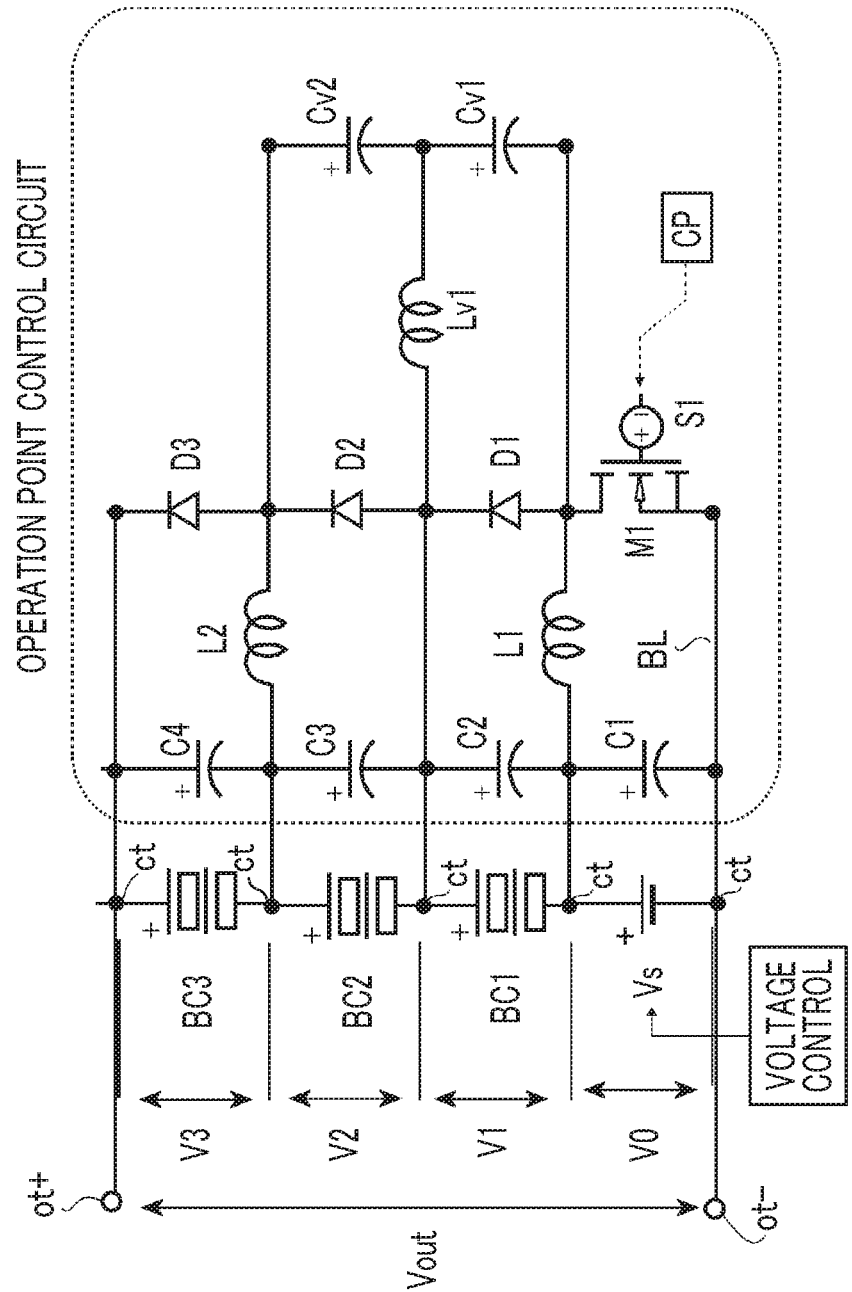
FIG. 9A is a circuit configuration diagram in a case where solar cells are replaced and any other power supply cells are connected in series in the power generation operation voltage control circuit device according to the embodiment.
Figure 9B:
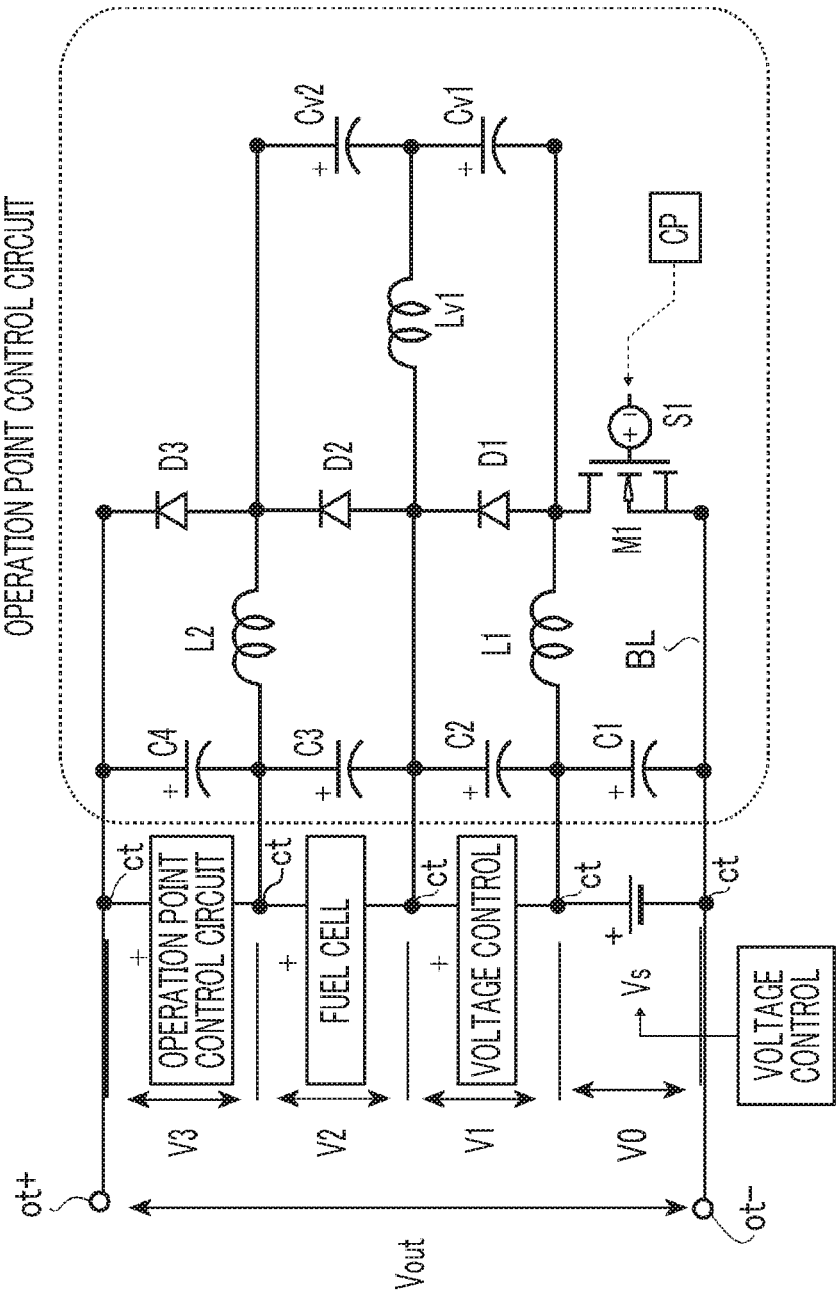
FIG. 9B is a circuit configuration diagram showing a case where solar cells are replaced and any other power supply cells are connected in series in the power generation operation voltage control circuit device according to the embodiment.
Figure 9C:
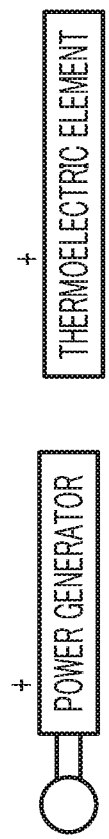
FIG. 9C is a diagram schematically showing an example of power supply cells that can be applied in the power generation operation voltage control circuit device according to the embodiment.

C. Application of Operation Voltage Control Circuit Device of Embodiment to Other Power Supply Elements As illustrated in FIGS. 9A to 9C, a series of configurations of the power generation operation voltage control circuit device according to the embodiment described above may be applied to a case where any power supply cells, such as chemical cells, storage cells (BCn), fuel cells (or solid oxide type fuel cells), thermoelectric elements, or power generators (or any power generators using wind power, hydroelectric power, tidal power, an engine, or the like), other than the solar cell are connected in series. Even though the power supply cells connected in series are different in optimum operation voltage, in a case where a decrease in output due to the deviation of the operation voltage is not so large, the operation voltage control circuit device is used according to the teaching of the embodiment, whereby it is possible to reduce time and effort for adjusting the operation voltage without significantly reducing the output. The configuration of the power generation operation voltage control circuit device according to the above-described embodiment may be applied to a case where the power supply cells connected in series are of the same kind or different kinds. For example, in the operation voltage control circuit device having the circuit configuration illustrated in FIG. 1A, 3A, 3B, 4, 6A, 7A, 7B, 8A, or 8D, any power supply cells, such as chemical cells, storage cells, fuel cells, thermoelectric elements, or power generators, may be connected in series in place of the solar cell, and different power supply cells may be used in a state connected in series.

In the operation voltage control circuit device of the embodiment, when a ratio (duty ratio) of a duration of the phase 2 to the predetermined cycle Ts is d, an operation voltage Vno of an odd-numbered power supply cell and an operation voltage Vne of an even-numbered power supply cell counted from the negative electrode side of the column of the power supply cells (excluding additional power supply cells) has a relationship of $Vne=\alpha Vno \ldots (9)$ using $\alpha=d/(1-d)$. For this reason, according to the embodiment, with the single operation voltage control circuit device, in a module in which power supply cells of two power supply cell groups having different desired operation voltages are alternately connected in series, it is possible to adjust the operation voltages of the two groups of power supply cells to desired voltages, respectively, by adjusting a reference voltage decided by the reference voltage decision unit and the duty ratio d.

Although the above description has been made in connection with the embodiment of the present disclosure, it will be apparent to those skilled in the art that many modifications and variations can be made and that the present disclosure is limited solely to the illustrated embodiment and is applicable to various devices without departing from the concept of the present disclosure.

What is claimed is:
1. An operation voltage control circuit device for a plurality of power supply cells connected in series, the operation voltage control circuit device characterized by comprising:
2k selective electrical conduction elements connected in series (where k is a positive integer) and configured to be selectively brought into an electrical conduction state in which electrical conduction is provided between both terminals of each of the selective electrical conduction elements or a cutoff state in which electrical conduction between both terminals is cut off;
2k capacitors connected in parallel to the respective selective electrical conduction elements and connected in series to one another;
inverted voltage generation units, each of the inverted voltage generation units being inserted into a 2i-th (where i is an integer of 1 to k) circuit line counted from one end among circuit lines, which connect terminals of the selective electrical conduction elements and terminals of the capacitors, configured such that a current is able to flow in both directions between both ends of each of the inverted voltage generation units, and configured to generate a voltage, which is cyclically inverted between both ends;
a pair of output terminals;
a plurality of electrode connection terminals connected to positive electrodes and negative electrodes of n (where n is an integer of 1 to 2k) power supply cells, which are connected in parallel to at least a part of the 2k capacitors and connected in series to one another, between the pair of output terminals;
a circuit controller configured to perform control such that the voltage generated between both ends of each of the inverted voltage generation units is cyclically inverted; and
a reference voltage setting unit configured to decide a reference voltage for deciding an output voltage between the pair of output terminals, characterized in that:
the circuit controller is configured to alternately switch a state of each of the selective electrical conduction elements connected in series in a predetermined cycle between a first phase where all odd-numbered selective electrical conduction elements counted from a negative electrode side of a power supply cell column in a column of the selective electrical conduction elements connected in series are brought into the electrical conduction state and all even-numbered selective electrical conduction elements counted from the negative electrode side of the power supply cell column in the column of the selective electrical conduction elements connected in series are brought into the cutoff state and a second phase where all odd-numbered selective electrical conduction elements counted from the negative electrode side of the power supply cell column in the column of the selective electrical conduction elements connected in series are brought into the cutoff state and all even-numbered selective electrical conduction elements counted from the negative electrode side of the power supply cell column in the column of the selective electrical conduction elements connected in series are brought into the electrical conduction state;
the circuit controller is configured to alternately invert a direction of the generated voltage of each of the inverted voltage generation units such that the generated voltage of each of the inverted voltage generation units becomes higher on the capacitor side in the first phase and becomes higher on the selective electrical conduction element side in the second phase;
an operation voltage of each of the power supply cells connected to the electrode connection terminals is decided based on a ratio of durations of the first phase and the second phase of the selective electrical conduction elements controlled by the circuit controller and the reference voltage; and
the operation voltage control circuit device further includes
2(k−1) auxiliary capacitors connected in parallel to the respective selective electrical conduction elements excluding the selective electrical conduction elements at both ends in the column of the selective electrical conduction elements and connected in series to one another, and
auxiliary inverted voltage generation units, each of the auxiliary inverted voltage generation units being inserted into a 2j-th (where j is an integer of 1 to k−1) circuit line counted from one end among circuit lines, which connect the terminals of the selective electrical conduction elements and terminals of the auxiliary capacitors, configured such that a current is able to flow in both directions between both ends of each of the inverted voltage generation units, and configured to generate a voltage, which is inverted between both ends in synchronization with switching between the first phase and the second phase of the state of each of the selective electrical conduction elements, and a direction of the generated voltage of each of the auxiliary inverted voltage generation units is alternately inverted such that the generated voltage of each of the auxiliary inverted voltage generation unit becomes higher on the selective electrical conduction element side in the first phase and becomes higher on the auxiliary capacitor side in the second phase.

2. The operation voltage control circuit device according to claim 1, wherein:

each of the selective electrical conduction elements is a switching element that selectively provides electrical conduction between both terminals of the capacitor connected corresponding to each of the selective electrical conduction elements;

each of the inverted voltage generation units and the auxiliary inverted voltage generation units is an inductor;

the circuit controller includes a switching controller that switches a state of each of the switching elements between the first phase and the second phase;

the generated voltage of each of the inverted voltage generation units and the auxiliary inverted voltage generation units is inverted in synchronization with switching control between the first phase and the second phase of the switching elements by the switching controller;

the reference voltage is the output voltage between the pair of output terminals; and the operation voltage of each of the power supply cells connected to the electrode connection terminals is decided based on the output voltage and the ratio of the durations of the first phase of the second phase of each of the switching elements.

3. The operation voltage control circuit device according to claim 2, wherein the power supply cells are connected in parallel to all of the capacitors, respectively.

4. The operation voltage control circuit device according to claim 2, wherein all of the capacitors are connected in series between the pair of output terminals.

5. The operation voltage control circuit device according to claim 1, wherein:

a column of second to 2k-th selective electrical conduction elements counted from one end of the column of the selective electrical conduction elements is a rectifier unit column in which rectifier units, each of which has anode and cathode and is configured to permit a flow of a current solely in a direction from the anode to the cathode, are connected in series;

cathode side of the rectifier unit column is connected to anode side of the power supply cell column; and the controller is configured to generate a voltage, which has a magnitude as a function of the reference voltage and a direction of which is cyclically inverted, between both ends of a first inverted voltage generation unit counted from the one end of the column of the selective electrical conduction elements among the inverted voltage generation units.

6. The operation voltage control circuit device according to claim 5, wherein:

each of the inverted voltage generation units and the auxiliary inverted voltage generation units is an inductor;

a first selective electrical conduction element counted from the one end of the column of the selective electrical conduction elements is a switching element that selectively provides electrical conduction between both terminals of the capacitor connected corresponding to the first selective electrical conduction element;

the circuit controller includes a switching controller that alternately switches a state between both terminals of the switching element between an electrical conduction state and a cutoff state cyclically;

the reference voltage setting unit includes a voltage source that is connected in parallel to the capacitor corresponding to the switching element and connected in series with the one end of the column of the selective electrical conduction elements, the voltage source being configured to generate a voltage having a magnitude discretionarily set between a positive electrode and a negative electrode of the voltage source;

the reference voltage is a supply voltage of the voltage source; and the generated voltage of each of the inverted voltage generation units and the auxiliary inverted voltage generation units and the operation voltage of each of the power supply cells connected to the electrode connection terminals are decided based on the supply voltage of the voltage source and the ratio of the durations of the first phase and the second phase of the selective electrical conduction elements controlled by the switching controller.

7. The operation voltage control circuit device according to claim 6, wherein the power supply cells and the voltage source are connected between the pair of output terminals.

8. The operation voltage control circuit device according to claim 6, wherein the power supply cells are connected between the pair of output terminals, and the voltage source is connected outside between the pair of output terminals.

9. The operation voltage control circuit device according to claim 6, wherein the switching element is configured to be controlled such that the state between both terminals is alternately switched between the electrical conduction state and the cutoff state cyclically at regular intervals.

10. The operation voltage control circuit device according to claim 5, wherein:

each of the inverted voltage generation units and the auxiliary inverted voltage generation units is an inductor;

a first selective electrical conduction element counted from the one end of the column of the selective electrical conduction elements is a switching element that selectively provides electrical conduction between both terminals of the capacitor connected corresponding to the first selective electrical conduction element;

the circuit controller includes a switching controller that alternately switches a state between both terminals of the switching element between an electrical conduction state and a cutoff state cyclically;

the reference voltage setting unit decides the output voltage between the pair of output terminals as the reference voltage; and the generated voltage of each of the inverted voltage generation units and the auxiliary inverted voltage generation units and the operation voltage of each of the power supply cells connected to the electrode connection terminals are decided based on the output voltage and the ratio of the durations of the first phase and the second phase of the selective electrical conduction elements controlled by the switching controller.

11. The operation voltage control circuit device according to claim 5, wherein:
the first selective electrical conduction element counted from the one end of the column of the selective electrical conduction elements is a rectifier unit connected in series to the rectifier unit column;
the circuit controller includes a primary coil of a transformer having the primary coil and a secondary coil;
the first inverted voltage generation unit is the secondary coil of the transformer;
the reference voltage setting unit is a circuit unit that generates the reference voltage, which has a magnitude discretionarily set and a direction of which is cyclically inverted, between both ends of the secondary coil of the transformer; and
the operation voltage of each of the power supply cells connected to the electrode connection terminals is decided based on the generated voltage between both ends of the first inverted voltage generation unit and the ratio of the durations of the first phase and the second phase of the selective electrical conduction elements.

12. The operation voltage control circuit device according to claim 11, wherein each of the inverted voltage generation units other than the first inverted voltage generation unit is the secondary coil of the transformer, and is configured such that a generated voltage is cyclically inverted in synchronization with the first inverted voltage generation unit.

13. The operation voltage control circuit device according to claim 11, wherein each of the inverted voltage generation units other than the first inverted voltage generation unit and the auxiliary inverted voltage generation units is an inductor, and is configured such that a generated voltage is cyclically inverted in synchronization with the first inverted voltage generation unit.

14. The operation voltage control circuit device according to claim 1, wherein each of the power supply cells is at least one of a solar cell, a chemical cell, a fuel cell, a storage cell, a power generator, a thermoelectric element, or a combination of the solar cell, the chemical cell, the fuel cell, the storage cell, the power generator, and the thermoelectric element.

15. The operation voltage control circuit device according to claim 1, wherein each of the power supply cells is a solar cell, and a generated voltage of the power supply cell receiving light the most among the power supply cells is set to a generated voltage at a maximum power point.

16. The operation voltage control circuit device according to claim 1, wherein the circuit controller is configured to switch the state of each of the selective electrical conduction elements such that the durations of the first phase and the second phase become the same.

* * * * *